US008837375B2

(12) United States Patent
Das et al.

(10) Patent No.: US 8,837,375 B2
(45) Date of Patent: Sep. 16, 2014

(54) SUPPORT FOR VOICE OVER FLEXIBLE BANDWIDTH CARRIER SYSTEMS

(71) Applicant: QUALCOMM Incorporated, San Diego, CA (US)

(72) Inventors: Soumya Das, San Diego, CA (US); Roy Franklin Quick, Jr., San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 13/707,436

(22) Filed: Dec. 6, 2012

(65) Prior Publication Data
US 2013/0148579 A1    Jun. 13, 2013

Related U.S. Application Data

(60) Provisional application No. 61/568,742, filed on Dec. 9, 2011, provisional application No. 61/658,270, filed on Jun. 11, 2012.

(51) Int. Cl.
*H04L 12/28*    (2006.01)
*H04W 28/20*    (2009.01)
*H04J 13/16*    (2011.01)

(52) U.S. Cl.
CPC ............... *H04W 28/20* (2013.01); *H04J 13/16* (2013.01)
USPC ......................................................... 370/328

(58) Field of Classification Search
None
See application file for complete search history.

(56) References Cited

U.S. PATENT DOCUMENTS

| 7,103,026 B2 | 9/2006 | Hall et al. |
| 7,193,982 B2 | 3/2007 | Frerking et al. |
| 2003/0081538 A1 | 5/2003 | Walton et al. |
| 2008/0123836 A1* | 5/2008 | Flensted-Jensen et al. ... 379/229 |
| 2008/0212693 A1* | 9/2008 | Razzell ............... 375/260 |
| 2011/0243066 A1 | 10/2011 | Nayeb et al. |
| 2012/0113831 A1 | 5/2012 | Pelletier et al. |
| 2013/0114415 A1 | 5/2013 | Das et al. |

(Continued)

FOREIGN PATENT DOCUMENTS

| GB | 2421880 A | 7/2006 |
| WO | 2010080904 A1 | 7/2010 |

OTHER PUBLICATIONS

International Search Report and Written Opinion—PCT/US2012/068548—ISA/EPO—Feb. 19, 2013.

(Continued)

*Primary Examiner* — John Blanton
(74) *Attorney, Agent, or Firm* — Jeffrey D. Jacobs

(57) ABSTRACT

Methods, systems, and devices are disclosed for providing data, such as voice data for a voice service, over flexible bandwidth carriers. Some embodiments include support for 12.2 kbps and/or 7.95 kbps AMR CS voice over flexible bandwidth UMTS (F-UMTS) in particular. Some embodiments provide for keeping the information data rate for a flexible bandwidth carrier at least the same as that of a normal bandwidth carrier. For example, one voice frame may still be mapped to a 20 ms time window upon transmission, irrespective of a flexible bandwidth scaling factor N or chip rate divider Dcr in F-UMTS. The tools and techniques provided may be implemented on mobile devices and/or base stations. Flexible bandwidths carriers may utilize portions of spectrum that may be too big or too small to fit a normal bandwidth waveform for a normal bandwidth carrier.

44 Claims, 15 Drawing Sheets

(56) References Cited

U.S. PATENT DOCUMENTS

| | | |
|---|---|---|
| 2013/0114433 A1 | 5/2013 | Park et al. |
| 2013/0114436 A1 | 5/2013 | Dural et al. |
| 2013/0114473 A1 | 5/2013 | Awoniyi et al. |
| 2013/0114566 A1 | 5/2013 | Awoniyi et al. |
| 2013/0114571 A1 | 5/2013 | Das et al. |
| 2013/0115967 A1 | 5/2013 | Soliman et al. |
| 2013/0115991 A1 | 5/2013 | Awoniyi et al. |
| 2013/0115994 A1 | 5/2013 | Awoniyi et al. |
| 2013/0121265 A1 | 5/2013 | Awoniyi et al. |
| 2013/0148520 A1 | 6/2013 | Das et al. |
| 2013/0148527 A1 | 6/2013 | Awiniyi et al. |
| 2013/0148576 A1 | 6/2013 | Huang et al. |
| 2013/0148627 A1 | 6/2013 | Das et al. |
| 2013/0148628 A1 | 6/2013 | Das et al. |
| 2013/0148629 A1 | 6/2013 | Das et al. |
| 2013/0150045 A1 | 6/2013 | Das et al. |
| 2013/0182655 A1 | 7/2013 | Das et al. |

OTHER PUBLICATIONS

LG Electronics: "Performance Comparisons of CA PUCCH Formats", 3GPP Draft; R1-102716_LG_EVAL_CA_PUCCH, 3rd Generation Partnership Project (3GPP), Mobile Competence Centre; 650, Route Des Lucioles; F-06921 Sophia-Antipolis Cedex; France, vol. RAN WG1, No. Montreal, Canada; May 10, 2010, May 4, 2010, XP050419919.

Ozturk, et al., "Performance of VoIP Services over 3GPP WCDMA Networks", IEEE 19th International Symposium on Personal, Indoor and Mobile Radio Communications [Online] 2008, pp. 1-6.

Co-pending U.S. Appl. No. 13/707,111, filed Dec. 6, 2012.

* cited by examiner

SUPPORT FOR VOICE OVER FLEXIBLE BANDWIDTH CARRIER SYSTEMS

CROSS-RELATED APPLICATIONS

The present application for patent claims priority to Provisional Application No. 61/568,742 entitled "SIGNAL CAPACITY BOOSTING, COORDINATED FORWARD LINK BLANKING AND POWER BOOSTING, AND REVERSE LINK THROUGHPUT INCREASING FOR FLEXIBLE BANDWIDTH SYSTEMS" filed Dec. 9, 2011, and assigned to the assignee hereof and hereby expressly incorporated by reference herein for all purposes. The present application for patent also claims priority to Provisional Application No. 61/658,270 entitled "SUPPORT FOR VOICE OVER FLEXIBLE BANDWIDTH SYSTEMS" filed Jun. 11, 2012, and assigned to the assignee hereof and hereby expressly incorporated by reference herein for all purposes.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Service providers are typically allocated blocks of frequency spectrum for exclusive use in certain geographic regions. These blocks of frequencies are generally assigned by regulators regardless of the multiple access technology being used. In most cases, these blocks are not integer multiple of channel bandwidths, hence there may be unutilized parts of the spectrum. As the use of wireless devices has increased, the demand for and value of this spectrum has generally increased, as well. Nonetheless, in some cases, wireless communications systems may not utilize portions of the allocated spectrum because the portions are not big enough to fit a standard or normal waveform. The developers of the LTE standard, for example, recognized the problem and decided to support many different system bandwidths (e.g., 1.4, 3, 5, 10, 15 and 20 MHz). This may provide a partial solution to the problem. Flexible bandwidth carriers may provide another solution to these problems. However, some types of voice service and other interactive applications may be delay sensitive, and it may be desirable to provide certain data rates and/or a certain quality of service without retransmission of lost data when utilizing flexible bandwidth carriers.

SUMMARY

Methods, systems, and devices are provided for utilizing flexible bandwidth carriers with different services, such as voice services. Some embodiments provide for support of Circuit Switched (CS) voice over flexible bandwidth carriers. For example, some embodiments provide support for transmitting data, such as voice data as part of a voice service, over a flexible bandwidth carrier. A data rate for a normal bandwidth carrier may be identified. A reduced spreading factor for the flexible bandwidth carrier may be determined such that a data rate for the flexible bandwidth carrier may achieve at least the identified data rate for the normal bandwidth carrier. The reduced spreading factor may be utilized to achieve the data rate for the flexible bandwidth carrier.

For example, in flexible bandwidth UMTS (F-UMTS), time may be scaled relative to the normal waveform as a means of achieving the low bandwidth signal. As a result, the chip rate in F-UMTS may be decreased relative to the chip rate in normal UMTS and accordingly chip duration is increased or dilated by the same factor. In F-UMTS, due to time dilation, chip duration, slot duration, frame duration, sub frame duration, radio frame duration, TTI may get dilated by a factor of Dcr, where Dcr is the chip rate divider used for F-UMTS. As a result, the current physical layer configurations for AMR voice service in UMTS, for example, may no longer meet the required data rate. Some embodiments address these issues.

Some embodiments, in particular, include support for 12.2 kbps and/or 7.95 kbps Adaptive Multi-Rate (AMR) CS voice over flexible bandwidth Universal Mobile Telecommunication System (F-UMTS) in particular. Some embodiments supporting CS voice in F-UMTS use the same vocoder as used in legacy UMTS and may address different issues including, but not limited to: data rates that may get scaled down by a chip rate divider (Dcr) factor in F-UMTS, additional delay that may get introduced due to transmission time interval (TTI) scaling in F-UMTS, and/or Transmit Power Control (TPC) Rate that may get scaled down to 1500/Dcr Hz in F-UMTS. A chip rate divider may be equal to the bandwidth scaling factor (i.e., N) for a flexible bandwidth carrier.

Some embodiments maintain voice quality through keeping the information data rate for a flexible bandwidth carrier the same as that of the normal bandwidth carrier. For example, one voice frame may still be mapped to a 20 ms time window upon transmission, irrespective of N or Dcr in F-UMTS. For AMR 12.2 kbps for N=2 F-UMTS, some embodiments utilize the following scheme that can maintain the voice quality: spreading factor reduction by Dcr=2 in both downlink (DL) and/or uplink (UL) relative to normal UMTS; for Signaling Radio Bearers (SRBs), 4 Dedicated Control Channels (DCCHs i.e. logical channels) are mapped to 1 Dedicated Transport Channel (DCH i.e. transport channel) using 20×Dcr (i.e., 20×2) ms=40 ms TTI; and for Radio Access Bearer (RAB), 3 Dedicated Traffic Channels (DTCHs i.e. logical channels) are mapped to 3 DCHs (transport channel) using 10×Dcr (i.e. 10×2) ms=20 ms TTI. For AMR 12.2 kbps for N=4 F-UMTS, some embodiments utilize the following scheme to maintain voice quality: spreading factor reduction by Dcr in both DL and UL and rate matching tuning; 4 SRBs→4 DCCHs→1 DCH using 10×Dcr (i.e. 10×4) ms=40 ms TTI; and/or 1 RAB→3 DTCHs→3 DCHs using 10×Dcr (i.e., 10×4) ms=40 ms TTI. Similar embodiments may be utilized for 7.95 kbps AMR. Spreading factors for respective F-UMTS systems may be reduced by dividing the spreading factor for a normal bandwidth carrier by Dcr such that the number of channel bits per 20 ms can stay unchanged. These schemes may be applied at both the mobile device (e.g., UE) and/or base station (e.g., NodeB).

Flexible bandwidths carriers may involve wireless communications systems that may utilize portions of spectrum that may not be big enough to fit a normal waveform utilizing flexible waveforms. A flexible bandwidth carrier may be generated with respect to a normal carrier bandwidth system through dilating, or scaling down, the time or the chip rate of the flexible bandwidth carrier with respect to the normal carrier bandwidth system. Some embodiments increase the bandwidth of a flexible waveform through expanding, or scaling up, the time or the chip rate of the flexible carrier bandwidth system.

Some embodiments include a method for providing data over a flexible bandwidth carrier. The method may include: identifying a data rate for a service over a normal bandwidth carrier; determining a reduced spreading factor for the flexible bandwidth carrier such that a data rate over the flexible bandwidth carrier achieves at least the identified data rate over the normal bandwidth carrier; and/or utilizing the reduced spreading factor to achieve the data rate over the flexible bandwidth carrier.

Some embodiments of the method include fitting one or both of a first voice frame and a second voice frame into a first radio frame of the flexible bandwidth carrier. The flexible bandwidth carrier may include a flexible bandwidth UMTS carrier with a bandwidth scaling factor equal to 2 or 4. The first radio frame may be a dilated radio frame.

In some embodiments, the date rate over the flexible bandwidth carrier depends upon an application of the data over the flexible bandwidth carrier. The application of the data over the flexible bandwidth carrier may include a voice application.

Determining the reduced spreading factor may include dividing a spreading factor of the normal bandwidth carrier by a chip rate divider of the flexible bandwidth carrier. The chip rate divider may equal a bandwidth scaling factor of the flexible bandwidth carrier.

Some embodiments of the method include applying rate matching tuning through at least a puncturing process or a repetition process. Some embodiments include increasing a transmission power to compensate for at least the reduced spreading factor. Some embodiments include determining a Transmission Time Interval to further facilitate the date rate for the flexible bandwidth carrier.

Some embodiments include a wireless communications system configured for providing data over a flexible bandwidth carrier. The system may include: means for identifying a data rate for s service over a normal bandwidth carrier; means for determining a reduced spreading factor for the flexible bandwidth carrier such that a data rate over the flexible bandwidth carrier is at least the identified data rate over the normal bandwidth carrier; and/or means for utilizing the reduced spreading factor to achieve the data rate over the flexible bandwidth carrier.

Some embodiments of the system include means for fitting one or both of a first voice frame and a second voice frame into a first radio frame of the flexible bandwidth carrier. The flexible bandwidth carrier may include a flexible bandwidth UMTS carrier with a bandwidth scaling factor equal to 2 or 4. The first radio frame may include a dilated radio frame.

In some embodiments, the means for determining the reduced spreading factor includes means for dividing a spreading factor of the normal bandwidth carrier by a chip rate divider of the flexible bandwidth carrier. The chip rate divider may equal a bandwidth scaling factor of the flexible bandwidth carrier.

In some embodiments, the date rate over the flexible bandwidth carrier depends upon an application of the data over the flexible bandwidth carrier. The application of the data over the flexible bandwidth carrier may include a voice application.

Some embodiments of the system include means for applying rate matching tuning through at least a puncturing process or a repetition process. Some embodiments include means for increasing a transmission power to compensate for at least the reduced spreading factor. Some embodiments include means for determining a Transmission Time Interval to further facilitate the date rate for the flexible bandwidth carrier.

Some embodiments include a computer program product for providing data over a flexible bandwidth carrier that may include a non-transitory computer-readable medium that may include: code for identifying a data rate for a service over a normal bandwidth carrier; code for determining a reduced spreading factor for the flexible bandwidth carrier such that a data rate over the flexible bandwidth carrier is at least the identified the data rate over the normal bandwidth carrier; and/or code for utilizing the reduced spreading factor to achieve the data rate over the flexible bandwidth carrier.

In some embodiments, the non-transitory computer-readable medium includes code for fitting one or both of a first voice frame and a second voice frame into a first radio frame of the flexible bandwidth carrier. The flexible bandwidth carrier may include a flexible bandwidth UMTS carrier with a bandwidth scaling factor equal to 2 or 4. The first radio frame may be a dilated radio frame.

The code for determining the reduced spreading factor may include code for dividing a spreading factor of the normal bandwidth carrier by a chip rate divider of the flexible bandwidth carrier. The chip rate divider may equal a bandwidth scaling factor of the flexible bandwidth carrier.

In some embodiments, the date rate over the flexible bandwidth carrier depends upon an application of the data over the flexible bandwidth carrier. The application of the data over the flexible bandwidth carrier may include a voice application.

In some embodiments, the non-transitory computer-readable medium includes code for applying rate matching tuning through at least a puncturing process or a repetition process. The non-transitory computer-readable medium may include code for increasing a transmission power to compensate for at least the reduced spreading factor. The non-transitory computer-readable medium may include code for determining a Transmission Time Interval to further facilitate the date rate for the flexible bandwidth carrier.

Some embodiments include a wireless communications device configured for providing data over a flexible bandwidth carrier. The device may include at least one processor that may be configured to: identify a data rate for a service over a normal bandwidth carrier; determine a reduced spreading factor for the flexible bandwidth carrier such that a data rate over the flexible bandwidth carrier is at least the identified data rate over the normal bandwidth carrier; and/or utilize the reduced spreading factor to achieve the data rate over the flexible bandwidth carrier.

In some embodiments, the at least one processor is further configured to fit one or both of a first voice frame and a second voice frame into a first radio frame of the flexible bandwidth carrier. The flexible bandwidth carrier may include a flexible bandwidth UMTS system with a bandwidth scaling factor equal to 2 or 4. The first radio frame may be a dilated radio frame.

The at least one processor configured to determine the reduced spreading factor may be configured to divide a spreading factor of the normal bandwidth carrier by a chip rate divider of the flexible bandwidth carrier. The chip rate divider may equal a bandwidth scaling factor of the flexible bandwidth carrier.

In some embodiments, the date rate over the flexible bandwidth carrier depends upon an application of the data over the flexible bandwidth carrier. The application of the data over the flexible bandwidth carrier may include a voice application.

In some embodiments, the at least one processor is further configured to apply rate matching tuning through at least a puncturing process or a repetition process. In some embodiments, the at least one processor is further configured to increase a transmission power to compensate for at least the reduced spreading factor. In some embodiments, the at least one processor is further configured to determine a Transmission Time Interval to further facilitate the date rate for the flexible bandwidth carrier.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
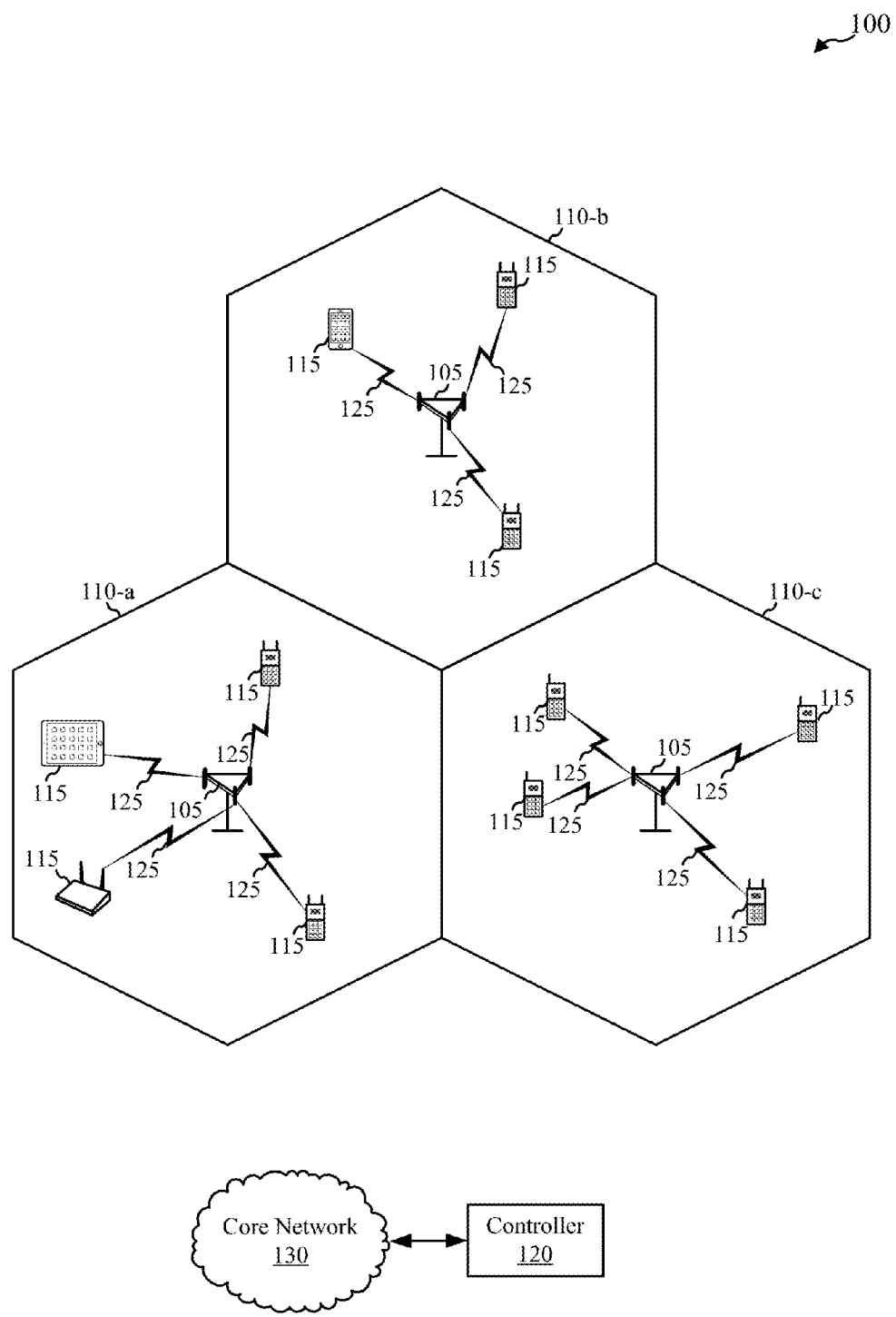
FIG. 1 shows a block diagram of a wireless communications system in accordance with various embodiments.

Methods, systems, and devices are provided for utilizing flexible bandwidth carriers with different services, such as voice services. Some embodiments provide for support of Circuit Switched (CS) voice over flexible bandwidth carriers. For example, some embodiments provide support for transmitting data, such as voice data as part of a voice service, over a flexible bandwidth carrier. A data rate over a normal bandwidth carrier may be identified. A reduced spreading factor for voice service over the flexible bandwidth carrier may be determined such that a data rate for the flexible bandwidth carrier may achieve at least the identified data rate for the normal bandwidth carrier. The reduced spreading factor may be utilized to achieve the data rate for the flexible bandwidth carrier.

For example, in flexible bandwidth UMTS (F-UMTS), time may be scaled relative to the normal waveform as a means of achieving the low bandwidth signal. As a result, the chip rate in F-UMTS may be decreased relative to the chip rate in normal UMTS and accordingly chip duration is increased or dilated by the same factor. In F-UMTS, due to time dilation, chip duration, slot duration, frame duration, sub frame duration, radio frame duration, TTI may get dilated by a factor of Dcr, where Dcr is the chip rate divider used for F-UMTS. As a result, the current physical layer configurations for AMR voice service in UMTS, for example, may no longer meet the required data rate. As a result, the current physical layer configurations for AMR voice service in UMTS, for example, may no longer meet the required data rate. Some embodiments address these issues.

Some embodiments, in particular, include support for 12.2 kbps and/or 7.95 kbps Adaptive Multi-Rate (AMR) CS voice over flexible bandwidth Universal Mobile Telecommunication System (F-UMTS) in particular. Some embodiments provide support for other ARM rates, such as 5.9 kbps. Some embodiments supporting CS voice in F-UMTS use the same vocoder as used in legacy UMTS and may address different issues including, but not limited to: data rates that may get scaled down by a chip rate divider (Dcr) factor in F-UMTS, additional delay that may get introduced due to transmission time interval (TTI) scaling in F-UMTS, and/or Transmit Power Control (TPC) Rate that may get scaled down to 1500/

Dcr Hz in F-UMTS. A chip rate divider may be equal to the bandwidth scaling factor (i.e., N) for a flexible bandwidth carrier.

Some embodiments maintain voice quality through keeping the information data rate for a flexible bandwidth carrier the same as that of the normal bandwidth carrier. For example, one voice frame may still be mapped to a 20 ms time window upon transmission, irrespective of N or Dcr in F-UMTS. For AMR 12.2 kbps for N=2 F-UMTS, some embodiments utilize the following scheme that can maintain the voice quality: spreading factor reduction by Dcr=2 in both downlink (DL) and/or uplink (UL) relative to normal UMTS; for Signaling Radio Bearers (SRBs), 4 Dedicated Control Channels (DCCHs i.e. logical channels) are mapped to 1 Dedicated Transport Channel (DCH i.e. transport channel) using 20×Dcr (i.e., 20×2) ms=40 ms TTI; and for Radio Access Bearer (RAB), 3 Dedicated Traffic Channels (DTCHs i.e. logical channels) are mapped to 3 DCHs (transport channel) using 10×Dcr (i.e. 10×2) ms=20 ms TTI. For AMR 12.2 kbps for N=4 F-UMTS, some embodiments utilize the following scheme to maintain voice quality: spreading factor reduction by Dcr in both DL and UL and rate matching tuning; 4 SRBs→4 DCCHs→1 DCH using 10×Dcr (i.e. 10×4) ms=40 ms TTI; and/or 1 RAB→3 DTCHs→3 DCHs using 10×Dcr (i.e., 10×4) ms=40 ms TTI. Similar embodiments may be utilized for 7.95 kbps AMR. Spreading factors for respective F-UMTS systems may be reduced by dividing the spreading factor for a normal bandwidth carrier by Dcr such that the number of channel bits per 20 ms can stay unchanged. These schemes may be applied at both the mobile device (e.g., UE) and/or base station (e.g., NodeB).

Techniques described herein may be used for various wireless communications systems such as CDMA, TDMA, FDMA, OFDMA, SC-FDMA, Peer-to-Peer, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA or OFDM system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100 in accordance with various embodiments. The system 100 includes base stations 105, mobile devices 115, a base station controller 120, and a core network 130 (the controller 120 may be integrated into the core network 130 in some embodiments; in some embodiments, controller 120 may be integrated into base stations 105). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, Time Division Multiple Access (TDMA) signal, Frequency Division Multiple Access (FDMA) signal, Orthogonal FDMA (OFDMA) signal, Single-Carrier FDMA (SC-FDMA) signal, etc. Each modulated signal may be sent on a different carrier and may carry control information (e.g., pilot signals), overhead information, data, etc. The system 100 may be a multi-carrier LTE network capable of efficiently allocating network resources.

The mobile devices 115 may be any type of mobile station, mobile device, access terminal, subscriber unit, or user equipment. The mobile devices 115 may include cellular phones and wireless communications devices, but may also include personal digital assistants (PDAs), smartphones, other handheld devices, netbooks, notebook computers, etc. Thus, the term mobile device should be interpreted broadly hereinafter, including the claims, to include any type of wireless or mobile communications device.

The base stations 105 may wirelessly communicate with the mobile devices 115 via a base station antenna. The base stations 105 may be configured to communicate with the mobile devices 115 under the control of the controller 120 via multiple carriers. Each of the base station 105 sites can provide communication coverage for a respective geographic area. In some embodiments, base stations 105 may be referred to as a NodeB, eNodeB, Home NodeB, and/or Home eNodeB. The coverage area for each base station 105 here is identified as 110-a, 110-b, or 110-c. The coverage area for a base station may be divided into sectors (not shown, but making up only a portion of the coverage area). The system 100 may include base stations 105 of different types (e.g., macro, micro, femto, and/or pico base stations).

The different aspects of system 100, such as the mobile devices 115, the base stations 105, the core network 130, and/or the controller 120 may be configured to utilize flexible bandwidth and waveforms in accordance with various embodiments. System 100, for example, shows transmissions 125 between mobile devices 115 and base stations 105. The transmissions 125 may include uplink and/or reverse link transmission, from a mobile device 115 to a base station 105, and/or downlink and/or forward link transmissions, from a base station 105 to a mobile device 115. The transmissions 125 may include flexible and/or normal waveforms. Normal waveforms may also be referred to as legacy and/or normal waveforms.

The different aspects of system 100, such as the mobile devices 115, the base stations 105, the core network 130, and/or the controller 120 may be configured to utilize flexible bandwidth and waveforms in accordance with various embodiments. For example, different aspects of system 100 may utilize portions of spectrum that may not be big enough to fit a normal waveform. Devices such as the mobile devices 115, the base stations 105, the core network 130, and/or the controller 120 may be configured to adapt the chip rates and/or scaling factors to generate and/or utilize flexible bandwidth and/or waveforms. Some aspects of system 100 may form a flexible subsystem (such as certain mobile devices 115 and/or base stations 105) that may be generated with respect to a normal subsystem (that may be implemented using other mobile devices 115 and/or base stations 105) through dilating, or scaling down, the time of the flexible subsystem with respect to the time of the normal subsystem.

In some embodiments, the different aspects of system 100, such as the mobile devices 115, the base stations 105, the core network 130, and/or the controller 120 may be configured for utilizing flexible bandwidth carriers with different services, such as voice services. Some embodiments, in particular, provide for support of Circuit Switched (CS) voice over flexible bandwidth carriers. For example, the different aspects of system 100, such as the mobile devices 115, the base stations 105, the core network 130, and/or the controller 120 may be configured for providing support for transmitting data, such as voice data as part of a voice service, over a flexible bandwidth carrier. A data rate for a normal bandwidth carrier may be identified. A reduced spreading factor for bearer over the flexible bandwidth carrier may be determined such that a data rate for the flexible bandwidth carrier may achieve at least the identified data rate for the normal bandwidth carrier. The reduced spreading factor may be utilized to achieve the data rate over the flexible bandwidth carrier.

In some embodiments the different aspects of system 100, such as the mobile devices 115, the base stations 105, the core network 130, and/or the controller 120 may be configured such that one voice frame may still be mapped to a 20 ms time window upon transmission, irrespective of N or Dcr in F-UMTS. For AMR 12.2 kbps for N=2 F-UMTS, some embodiments utilize the following scheme that can maintain the voice quality: spreading factor reduction by Dcr=2 in both downlink (DL) and/or uplink (UL) relative to normal UMTS; for Signaling Radio Bearers (SRBs), 4 Dedicated Control Channels (DCCHs i.e. logical channels) are mapped to 1 Dedicated Transport Channel (DCH i.e. transport channel) using 20×Dcr (i.e., 20×2) ms=40 ms TTI; and for Radio Access Bearer (RAB), 3 Dedicated Traffic Channels (DTCHs i.e. logical channels) are mapped to 3 DCHs (transport channel) using 10×Dcr (i.e. 10×2) ms=20 ms TTI. For AMR 12.2 kbps for N=4 F-UMTS, some embodiments utilize the following scheme to maintain voice quality: spreading factor reduction by Dcr in both DL and UL and rate matching tuning; 4 SRBs→4 DCCHs→1 DCH using 10×Dcr (i.e. 10×4) ms=40 ms TTI; and/or 1 RAB→3 DTCHs→3 DCHs using 10×Dcr (i.e., 10×4) ms=40 ms TTI. Similar embodiments may be utilized for 7.95 kbps AMR. Spreading factors for respective F-UMTS systems may be reduced by dividing the spreading factor for a normal bandwidth carrier by Dcr such that the number of channel bits per 20 ms can stay unchanged. These schemes may be applied by the different aspects of system 100, such as the mobile devices 115, the base stations 105, the core network 130, and/or the controller 120.

In some embodiments, the different aspects of system 100, such as the mobile devices 115, the base stations 105, the core network 130, and/or the controller 120 may be configured to identify a data rate for a normal bandwidth carrier. A scaling factor of the flexible bandwidth carrier may be identified. In some embodiments, a reduced spreading factor may be determined for the flexible bandwidth carrier such that a data rate of the flexible bandwidth carrier is the same as the data rate for the normal bandwidth carrier. Determining the reduced spreading factor may include dividing a spreading factor of the normal bandwidth carrier by a chip rate divider. The chip rate divider may equal the scaling factor of the flexible bandwidth carrier. Some embodiments include fitting a first voice frame into a first radio frame. The flexible bandwidth carrier may be a flexible bandwidth UMTS system with the scaling factor equal to 2 in some of these embodiments. Some embodiments include fitting a first voice frame and a second voice frame into a first radio frame. The flexible bandwidth carrier may be a flexible bandwidth UMTS system with the scaling factor equal to 4 in some of these embodiments. In some embodiments, the first radio frame is a dilated radio frame. Some embodiments include applying rate matching tuning through at least a puncturing process or a repetition process. Some embodiments include increasing a transmission power to compensate for at least the reduced spreading factor. Some embodiments include determining a TTI to facilitate the data rate of the flexible bandwidth carrier.

Some embodiments may include mobile devices and/or base stations, such as mobile devices 115 and/or base stations 105 of system 100 of FIG. 1, that may generate flexible waveforms and/or normal waveforms. Flexible waveforms may occupy less bandwidth than a normal waveform. For example, at a band edge, there may not be enough available spectrum to place a normal waveform. For a flexible waveform in some embodiments, as time gets dilated, the frequency occupied by a waveform goes down, thus making it possible to fit a flexible waveform into spectrum that may not be broad enough to fit a normal waveform. Flexible waveforms may also be generated in some embodiments through using a scaling factor. Other embodiments may generate a flexible waveform to fit a portion of spectrum through altering a rate or chip rate (e.g., a spreading factor may change). Some embodiments may change a frequency of processing to change a chip rate or utilize a scaling factor. Changing frequency of processing may include changing an interpolation rate, an interrupt rate, and/or a decimation rate. In some embodiments, a chip rate may be changed or a scaling factor utilized through filtering, by decimation, and/or by changing a frequency of an ADC, a DAC, and/or an offline clock. A divider may be used to change the frequency of at least one clock.

In some embodiments, a flexible system or waveform may be a fractional system or waveform. Fractional systems and/or waveforms may or may not change bandwidth for example. A fractional system or waveform may be flexible because it may offer more possibilities than a normal system or waveform (e.g., N=1 system). A normal system or waveform may refer to a standard and/or legacy system or waveform.

Figure 2A:
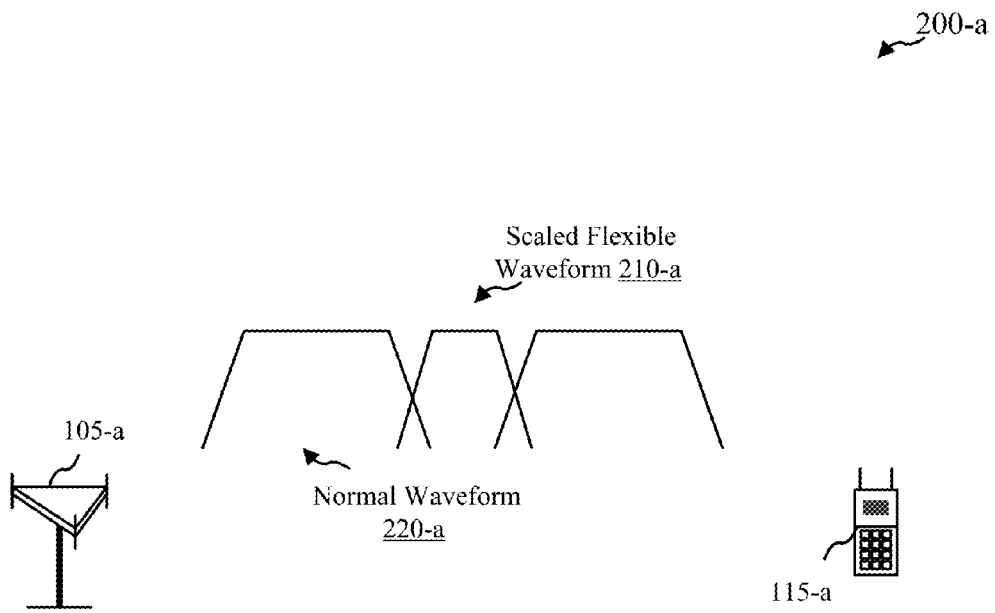
FIG. 2A shows an example of a wireless communications system where a flexible waveform fits into a portion of spectrum not broad enough to fit a normal waveform in accordance with various embodiments.

FIG. 2A shows an example of a wireless communications system 200-a with a base station 105-a and a mobile device 115-a in accordance with various embodiments, where a flexible waveform 210-a fits into a portion of spectrum not broad enough to fit a normal waveform 220-a. System 200-a may be an example of system 100 of FIG. 1. In some embodiments, the flexible waveform 210-a may overlap with the normal waveform 220-a that either the base station 105-a and/or the mobile device 115-a may transmit. In some cases, the normal waveform 220-a may completely overlap the flexible waveform 210-a. Some embodiments may also utilize multiple flexible waveforms 210. In some embodiments, another base station and/or mobile device (not shown) may transmit the normal waveform 220-a and/or the flexible waveform 210-a.

Figure 2B:
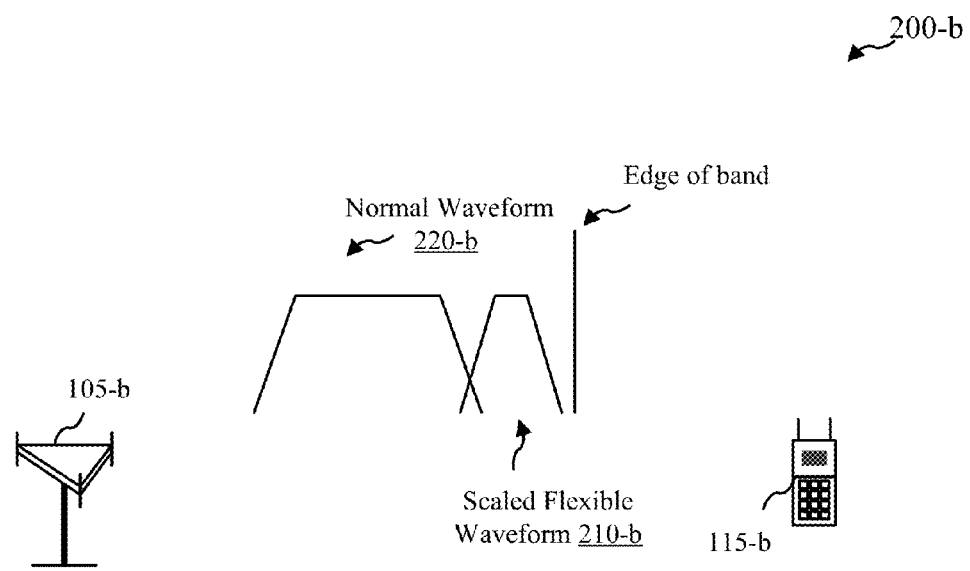
FIG. 2B shows an example of a wireless communications system where a flexible waveform fits into a portion of spectrum near an edge of a band in accordance with various embodiments.

In some embodiments, the mobile device 115-a and/or the base station 105-a may be configured to support different services, such as voice services, over a flexible bandwidth carrier. Some embodiments, in particular, provide for support of Circuit Switched (CS) voice over flexible bandwidth carriers. For example, the mobile device 115-a and/or the base station 105-a may be configured to provide support for transmitting data, such as voice data as part of a voice service, over a flexible bandwidth carrier. A data rate for a normal bandwidth carrier may be identified. A reduced spreading factor for the flexible bandwidth carrier may be determined such that a data rate for the flexible bandwidth carrier may achieve at least the identified data rate for the normal bandwidth carrier. The reduced spreading factor may be utilized to achieve the data rate for the flexible bandwidth carrier. FIG. 2B shows an example of a wireless communications system 200-b with a base station 105-b and mobile device 115-b, where a flexible waveform 210-b fits into a portion of spectrum near an edge of a band, which may be a guard band, where normal waveform 220-b may not fit. System 200-b may be an example of system 100 of FIG. 1. Similar techniques for supporting voice services utilizing scaled flexible waveform 210-b may be applicable as discussed above.

Figure 3:
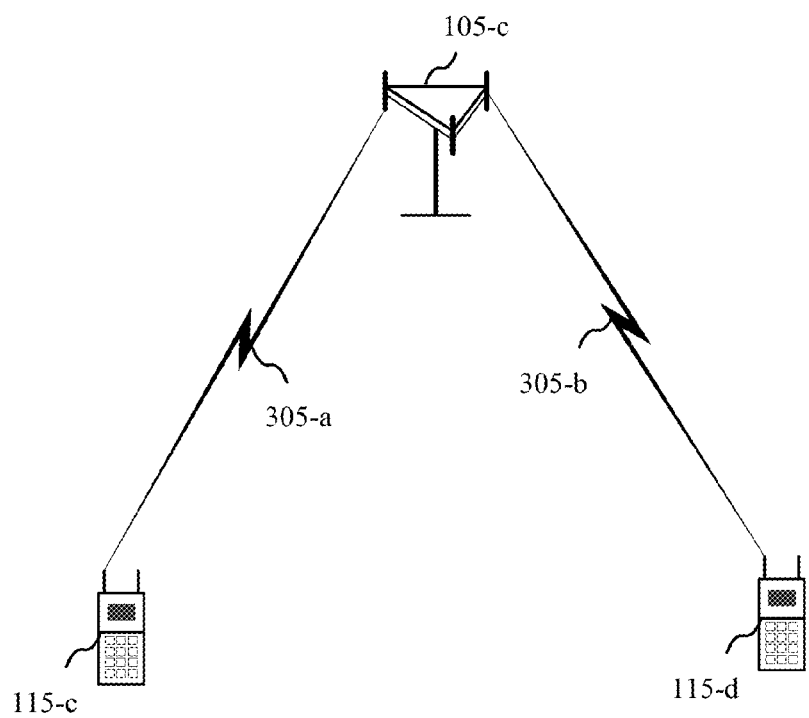
FIG. 3 shows a block diagram of a wireless communications system in accordance with various embodiments.

FIG. 3 shows a wireless communications system 300 with a base station 105-c and mobile devices 115-c and 115-d, in accordance with various embodiments. In some embodiments, the base station 105-c and/or the mobile devices 115-c/115-d may be configured for providing services, such as voice services, within a flexible bandwidth carrier. For example, transmissions 305-a and/or 305-b between the mobile device 115-c/115-d and the base station 105-c may involve transmissions that have been scaled utilizing flexible waveforms.

The base station 105-c and/or the mobile devices 115-c/115-d may be configured to provide for keeping the information data rate for a flexible bandwidth carrier the same as that of the normal bandwidth carrier. For example, one voice frame may still be mapped to a 20 ms time window upon transmission, irrespective of N or Dcr in F-UMTS. For AMR 12.2 kbps for N=2 F-UMTS, base station 105-c and/or the mobile devices 115-c/115-d may utilize the following scheme that can maintain the voice quality: spreading factor reduction by Dcr=2 in both downlink (DL) and/or uplink (UL) relative to normal UMTS; for Signaling Radio Bearers (SRBs), 4 Dedicated Control Channels (DCCHs i.e. logical channels) are mapped to 1 Dedicated Transport Channel (DCH i.e. transport channel) using 20×Dcr (i.e., 20×2) ms=40 ms TTI; and for Radio Access Bearer (RAB), 3 Dedicated Traffic Channels (DTCHs i.e. logical channels) are mapped to 3 DCHs (transport channel) using 10×Dcr (i.e. 10×2) ms=20 ms TTI. For AMR 12.2 kbps for N=4 F-UMTS, base station 105-c and/or the mobile devices 115-c/115-d may utilize the following scheme to maintain voice quality: spreading factor reduction by Dcr in both DL and UL and rate matching tuning; 4 SRBs→4 DCCHs→1 DCH using 10×Dcr (i.e. 10×4) ms=40 ms TTI; and/or 1 RAB→3 DTCHs→3 DCHs using 10×Dcr (i.e., 10×4) ms=40 ms TTI. Similar embodiments may be utilized for 7.95 kbps AMR. Spreading factors for respective F-UMTS systems may be reduced by base station 105-c and/or the mobile devices 115-c/115-d by dividing the spreading factor for a normal bandwidth carrier by Dcr such that the number of channel bits per 20 ms can stay unchanged. These schemes may be applied at both the mobile device (e.g., UE) and base station (e.g., NodeB).

In some embodiments, the base station 105-c and/or the mobile devices 115-c/115-d may be configured to support different services, such as voice services, over a flexible bandwidth carrier. Some embodiments, in particular, provide for support of Circuit Switched (CS) voice over flexible bandwidth carriers. For example, the base station 105-c and/or the mobile devices 115-c/115-d may be configured to provide support for transmitting data, such as voice data as part of a voice service, over a flexible bandwidth carrier. A data rate for a normal bandwidth carrier may be identified. A reduced spreading factor for the flexible bandwidth carrier may be determined such that a data rate for the flexible bandwidth carrier may achieve at least the identified data rate for the normal bandwidth carrier. The reduced spreading factor may be utilized to achieve the data rate for the flexible bandwidth carrier.

In some embodiments, base station 105-c and/or the mobile devices 115-c/115-d a may identify data rate for a normal bandwidth carrier may be identified. A scaling factor of the flexible bandwidth carrier may be identified by base station 105-c and/or the mobile devices 115-c/115-d. In some embodiments, a reduced spreading factor may be determined by base station 105-c and/or the mobile devices 115-c/115-d for the flexible bandwidth carrier such that a data rate of the flexible bandwidth carrier is the same as the data rate for the normal bandwidth carrier. Determining the reduced spreading factor may include dividing a spreading factor of the normal bandwidth carrier by a chip rate divider. The chip rate divider may equal the scaling factor of the flexible bandwidth carrier. Some embodiments include fitting a first voice frame into a first radio frame. The flexible bandwidth carrier may be a flexible bandwidth UMTS system with the scaling factor equal to 2 in these embodiments. Some embodiments include fitting a first voice frame and a second voice frame into a first radio frame. The flexible bandwidth carrier may be a flexible bandwidth UMTS system with the scaling factor equal to 4 in these embodiments. In some embodiments, the first radio frame is a dilated radio frame. Some embodiments include applying rate tuning matching through at least a puncturing process or a repetition process. Some embodiments include increasing a transmission power to compensate for at least the reduced spreading factor.

Transmissions 305-a and/or 305-b between the mobile device 115-c/115-d and the base station 105-c may utilize flexible waveforms that may be generated to occupy less (or more) bandwidth than a normal waveform. For example, at a band edge, there may not be enough available spectrum to place a normal waveform. For a flexible waveform, as time gets dilated, the frequency occupied by a waveform goes down, thus making it possible to fit a flexible waveform into spectrum that may not be broad enough to fit a normal waveform. In some embodiments, the flexible waveform may be scaled utilizing a scaling factor N with respect to a normal waveform. Scaling factor N may take on numerous different values including, but not limited to, integer values such as 1, 2, 4, etc. N, however, does not have to be an integer.

Some embodiments may utilize additional terminology. A new unit D may be utilized. The unit D is dilated. It is unitless and has the value of N. One can talk about time in the flexible system in terms of "dilated time." For example, a slot of say 10 ms duration in normal bandwidth carrier may be represented as 10 Dms as 10 Dms=10×Dcr ms=10 ms for a normal bandwidth carrier. In time scaling, one can replace most "seconds" with "dilated-seconds." Note frequency in Hertz is 1/s. As noted above, some embodiments may also utilize a chip rate divider ("Dcr"), which may also have the value N.

As discussed above, a flexible waveform may be a waveform that occupies less bandwidth than a normal waveform. Thus, in a flexible bandwidth carrier, the same number of symbols and bits may be transmitted over a longer duration compared to a normal bandwidth carrier. This may result in time stretching, whereby slot duration, frame duration, etc., may increase by a scaling factor N. Scaling factor N may represent the ratio of the normal bandwidth to flexible bandwidth (BW). Thus, data rate in a flexible bandwidth carrier may equal (Normal Rate×1/N), and delay may equal (Normal Delay×N). In general, a flexible systems channel BW=channel BW of normal systems/N. Delay×BW may remain unchanged. Furthermore, in some embodiments, a flexible waveform may be a waveform that occupies more bandwidth than a normal waveform.

Throughout this specification, the term normal system, subsystem, and/or waveform may be utilized to refer to systems, subsystems, and/or waveforms that involve embodiments that may utilize a scaling factor that may be equal to one (e.g., N=1) or a normal or standard chip rate. These normal systems, subsystems, and/or waveforms may also be referred to as standard and/or legacy systems, subsystems, and/or waveforms. Furthermore, flexible systems, subsystems, and/or waveforms may be utilized to refer to systems, subsystems, and/or waveforms that involve embodiments that may utilize a scaling factor that may be not equal to one (e.g., N=2, 4, 8, ½, ¼, etc.). For N>1, or if a chip rate is decreased, the bandwidth of a waveform may decrease. Some embodiments may utilize scaling factors or chip rates that increase the bandwidth. For example, if N<1, or if the chip rate is increased, then a waveform may be expanded to cover bandwidth larger than a normal waveform. Flexible systems, subsystems, and/or waveforms may also be referred to as fractional systems, subsystems, and/or waveforms in some cases. Fractional systems, subsystems, and/or waveforms may or may not change bandwidth, for example. A fractional system, subsystem, or waveform may be flexible because it may offer more possibilities than a normal or standard system, subsystem, or waveform (e.g., N=1 system).

Figure 4A:
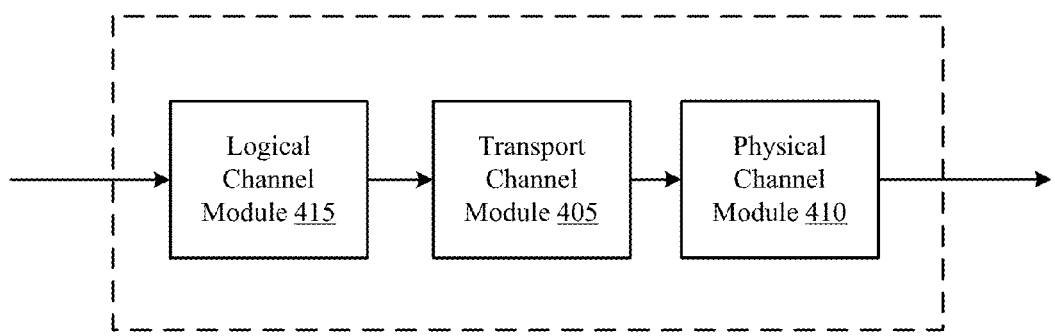
FIG. 4A shows a block diagram of a device configured to provide data, such as voice data as part of a voice service, over a flexible bandwidth carrier in accordance with various embodiments.

Turning next to FIG. 4A, a block diagram illustrates a device 400-a for providing data, such as voice data as part of a voice service, over a flexible bandwidth carrier in accordance with various embodiments. The device 400-a may be an example of one or more aspects of base stations 105 described with reference to FIG. 1, FIG. 2, FIG. 3, FIG. 11, and/or FIG. 13. The device 400-a may be an example of one or more aspects of mobile devices 115 described with reference to FIG. 1, FIG. 2, FIG. 3, FIG. 11, FIG. 12, and/or FIG. 13. The device 400 may also be a processor. The device 400-a may include a logical channel module 415, a transport channel module 405 and/or a physical channel module 410. Components of device 400-a may include a vocoder. Each of these components may be in communication with each other.

These components of the device 400-a may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Device 400-a, through logical channel module 415, transport channel module 405 and/or physical channel module 410, may be configured for keeping the information data rate over a flexible bandwidth carrier the same as that of the normal bandwidth carrier. A data rate for a service over a normal bandwidth carrier may be identified by device 400-a, through logical channel module 415, transport channel module 405 and/or physical channel module 410, for example. Device 400-a, through logical channel module 415, transport channel module 405 and/or physical channel module 410, may determine a reduced spreading factor for the flexible bandwidth carrier that a data rate over the flexible bandwidth carrier may achieve at least the identified data rate over the normal bandwidth carrier. Device 400-a, through physical channel module 410, may utilize the reduced spreading factor to achieve the data rate over the flexible bandwidth carrier.

Device 400-a, through logical channel module 415, transport channel module 405 and/or physical channel module 410, may fit one or both of a first voice frame and a second voice frame into a first radio frame of the flexible bandwidth carrier. The first radio frame may be a dilated radio frame. Determining the reduced spreading factor may include dividing a spreading factor of the normal bandwidth carrier by a chip rate divider of the flexible bandwidth carrier. The chip rate divider may equal a bandwidth scaling factor of the flexible bandwidth carrier.

The date rate over the flexible bandwidth carrier may depend upon an application of the data over the flexible bandwidth carrier. The application of the data over the flexible bandwidth carrier may include a voice application. Device 400-a, through transport channel module 405, may apply rate matching tuning through at least a puncturing process or a repetition process. Device 400-a, through physical channel module 410, may increasing a transmission power to compensate for at least the reduced spreading factor. Device 400-a, through transport channel module 405, may determine and/or utilize a TTI to further facilitate the data rate over the flexible bandwidth carrier. Device 400-a, through transport channel module 405, may concatenate multiple transport blocks. Device 400-a may be implemented with respect to a flexible bandwidth carrier that may include a flexible bandwidth UMTS carrier with a bandwidth scaling factor equal to 2 or 4.

Figure 4B:
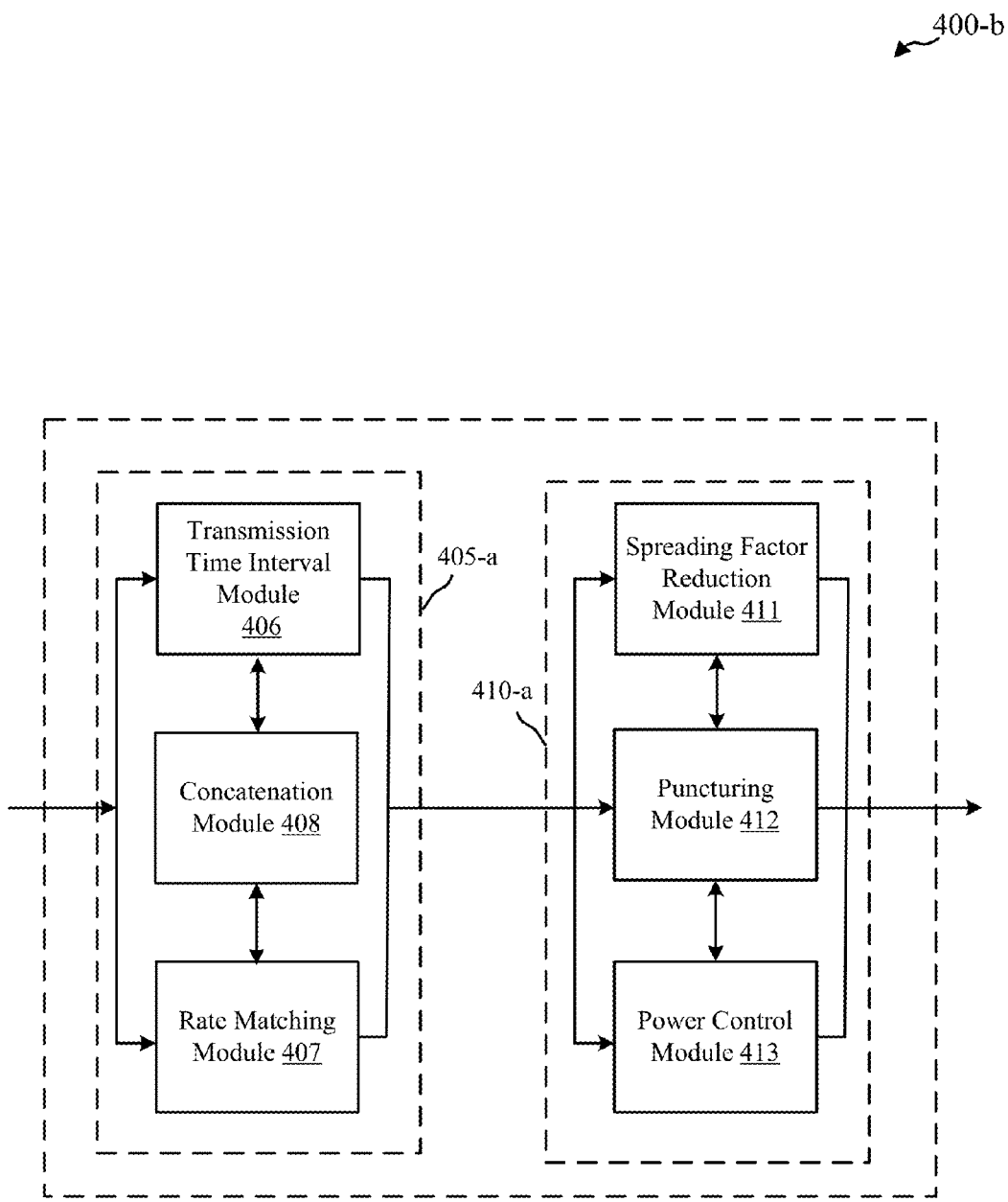
FIG. 4B shows a block diagram of a device configured to provide data, such as voice data as part of a voice service, over a flexible bandwidth carrier in accordance with various embodiments.

Turning next to FIG. 4B, a block diagram illustrates a device 400-b for providing data, such as voice data as part of a voice service, over a flexible bandwidth carrier in accordance with various embodiments. The device 400-b may be an example of one or more aspects of base stations 105 described with reference to FIG. 1, FIG. 2, FIG. 3, FIG. 11, and/or FIG. 13. The device 400 may be an example of one or more aspects of mobile devices 115 described with reference to FIG. 1, FIG. 2, FIG. 3, FIG. 11, FIG. 12, and/or FIG. 13. The device 400 may also be a processor. The device 400-b may include a transport channel module 405-a and/or a physical channel module 410-a. Transport channel module 405-a may include a transmission time interval module 406, a concatenation module 408, and/or a rate matching module 407. The physical channel module 410-a may include a spreading factor module 411, a puncturing module 412, and/or a power control module 413. Transport channel module 405-a may be an example of transport channel module 405 of FIG. 4A. Physical channel module 410-a may be an example of physical channel module 410 of FIG. 4A. Components of device 400-b may include a vocoder. Each of these components may be in communication with each other. Device 400-b may also include a logical channel module (not shown), similar to logical channel module 415 of device 400-a of FIG. 4A.

These components of the device 400-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Device 400-b, through transport channel module 405-a and/or physical channel module 410-a, may be configured for keeping the information data rate over a flexible bandwidth carrier the same as that of the normal bandwidth carrier. A data rate for a service over a normal bandwidth carrier may be identified by device 400-b, through transport channel module 405-a and/or physical channel module 410-a, for example. Device 400-b, through transport channel module 405-a and/or physical channel module 410-a, may determine a reduced spreading factor for the flexible bandwidth carrier that a data rate over the flexible bandwidth carrier may achieve at least the identified data rate over the normal bandwidth carrier. Device 400-b, through physical channel module 410-a (via spreading factor reduction module 411), may utilize the reduced spreading factor to achieve the data rate for the flexible bandwidth carrier.

Device 400-b, through transport channel module 405-a and/or physical channel module 410-a, may fit one or both of a first voice frame and a second voice frame into a first radio frame of the flexible bandwidth carrier. The first radio frame may be a dilated radio frame. Determining the reduced spreading factor may include dividing a spreading factor of the normal bandwidth carrier by a chip rate divider of the flexible bandwidth carrier. The chip rate divider may equal a bandwidth scaling factor of the flexible bandwidth carrier.

The date rate over the flexible bandwidth carrier may depend upon an application of the data over the flexible bandwidth carrier. The application of the data over the flexible bandwidth carrier may include a voice application.

Device 400-b, through transport channel module 405-a (via rate matching module 407), may apply rate matching tuning through at least a puncturing process or a repetition process. Device 400-b, through physical channel module 410-a (via power control module 413) may increasing a transmission power to compensate for at least the reduced spreading factor. Device 400-b, through transport channel module 406 (via transmission time interval module 406) may determine and/or utilize a TTI to facilitate a data rate for a flexible bandwidth carrier. Device 400-b, through transport channel module 405-a (via concatenation module 408), may concatenate multiple transport blocks.

Device 400-b may be implemented with respect to a flexible bandwidth carrier that may include a flexible bandwidth UMTS carrier with a bandwidth scaling factor equal to 2 or 4.

Some embodiments may utilize devices such as device 400-a and/or 400-b to provide for support of Circuit Switched (CS) voice over flexible bandwidth carriers. Some embodiments include support for 12.2 kbps and/or 7.95 kbps AMR CS voice over flexible bandwidth UMTS (F-UMTS). Supporting CS voice in F-UMTS using the same vocoder as used in legacy UMTS may address different issues including, but not limited to, issues such as: data rates that may get scaled down by factor Dcr in F-UMTS, additional delay that may get introduced due to transmission time interval (TTI) scaling in F-UMTS, and/or Transmit Power Control (TPC) Rate that may get scaled down to 1500/Dcr Hz in F-UMTS. Dcr may represent a chip rate divider that may be used for F-UMTS. The value of Dcr may be equal to the bandwidth scaling factor in F-UMTS (i.e., N).

For example, in flexible bandwidth UMTS (F-UMTS), time may be scaled relative to the normal waveform as a means of achieving the low bandwidth signal. As a result, the chip rate in F-UMTS may be decreased relative to the chip rate in normal UMTS and accordingly chip duration is increased or dilated by the same factor. In F-UMTS, due to time dilation, chip duration, slot duration, frame duration, sub frame duration, radio frame duration, TTI may get dilated by a factor of Dcr, where Dcr is the chip rate divider used for F-UMTS. As a result, the current physical layer configurations for AMR voice service in UMTS, for example, may no longer meet the required data rate. As a result, the current physical layer configurations for AMR voice service in UMTS may no longer meet the required data rate. Embodiments may address these issues.

Some embodiments may provide solutions for AMR 12.2 kbps for N=2 F-UMTS. While these examples may focus on AMR 12.2 kbps for N=2 F-UMTS, other embodiments may utilize similar tools and techniques that may utilize other scaling factors, data rates, and/or radio access technologies. Embodiments may include different transmission schemes. In order to maintain the same voice quality in a flexible bandwidth carrier, it may be desirable to keep the information data rate the same as that of the normal mode (12.2 kbps in these examples). That is, one voice frame may still be mapped to a 20 ms time window upon transmission, irrespective of N or Dcr in F-UMTS. Some embodiments utilize the following scheme that can maintain the voice quality:

Spreading factor reduction by Dcr (e.g., Dcr=2) in both DL and UL;

4 SRBs→4 DCCHs→1 DCH using 20×Dcr i.e. 20×2 ms=40 ms TTI; and/or

1 RAB→3 DTCHs→3 DCHs using 10×Dcr i.e. 10×2 ms=20 ms TTI.

This scheme may be applied at both the mobile device (e.g., UE) and/or base station (e.g., NodeB).

Different configurations may be utilized for the dedicated physical data channel (DPDCH) for both the uplink and downlink with a N=2 F-UMTS system in accordance with various embodiments. For the normal operating mode (i.e. N=1), let $SF_{norm}$ be the spreading factor, for example. According to 3GPP TS34.108, Section 6.10.2.4.1.4, $SF_{norm,\ UL}$=64 for uplink and $SF_{norm,\ DL}$=128 for downlink. For the N=2 F-UMTS system, the spreading factor may be calculated as below so that the number of channel bits per 20 ms can stay unchanged:

$$SF_{flex} = \frac{SF_{norm}}{D_{cr}}.$$

It may be noted that for N=2 F-UMTS, Dcr=2 in some embodiments.

Table 1 shows transport channel parameters for conversational/speech/UL: 12.2 kbps/CS RAB in accordance with various embodiments

TABLE 1

| Higher layer | RAB/Signalling RB | RAB subflow #1 | RAB subflow #2 | RAB subflow #3 |
|---|---|---|---|---|
| RLC | Logical channel type | | DTCH | |
| | RLC mode | TM | TM | TM |

TABLE 1-continued

| | | | | |
|---|---|---|---|---|
| | Payload sizes, bit | 39, 81 (alt. 0, 39, 81) | 103 | 60 |
| | Max data rate, bps | | 12 200 | |
| | TrD PDU header, bit | | 0 | |
| MAC | MAC header, bit | | 0 | |
| | MAC multiplexing | | N/A | |
| Layer 1 | TrCH type | DCH | DCH | DCH |
| | TB sizes, bit | 39, 81 (alt. 0, 39, 81) | 103 | 60 |
| | TFS   TF0, bits | 0 × 81(alt. 1 × 0) (note) | 0 × 103 | 0 × 60 |
| | TF1, bits | 1 × 39 | 1 × 103 | 1 × 60 |
| | TF2, bits | 1 × 81 | N/A | N/A |
| | TTI, ms | 10 × Dcr = 10 × 2 | 10 × Dcr = 10 × 2 | 10 × Dcr = 10 × 2 |
| | Coding type | CC ⅓ | CC ⅓ | CC ½ |
| | CRC, bit | 12 | N/A | N/A |
| | Max number of bits/TTI after channel coding | 303 | 333 | 136 |
| | Uplink: Max number of bits/radio frame before rate matching | 303 | 333 | 136 |
| | RM attribute | 180 to 220 | 170 to 210 | 215 to 256 |

(note): In case of using this alternative, CRC parity bits may be attached to RAB subflow #1 any time since number of TrBlks are 1 even if there is no data on RAB subflow #1 (see, e.g., clause 4.2.1.1 in 3GPP TS 25.212)

Table 2 shows transport channel parameters for UL:3.4 kbps SRBs for DCCH in accordance with various embodiments.

TABLE 2

| Higher layer | RAB/signalling RB | SRB#1 | SRB#2 | SRB#3 | SRB#4 |
|---|---|---|---|---|---|
| | User of Radio Bearer | RRC | RRC | NAS_DT High priority | NAS_DT Low priority |
| RLC | Logical channel type | DCCH | DCCH | DCCH | DCCH |
| | RLC mode | UM | AM | AM | AM |
| | Payload sizes, bit | 136 | 128 | 128 | 128 |
| | Max data rate, bps | 3 400 | 3 200 | 3 200 | 3 200 |
| | AMD/UMD PDU header, bit | 8 | 16 | 16 | 16 |
| MAC | MAC header, bit | 4 | 4 | 4 | 4 |
| | MAC multiplexing | 4 logical channel multiplexing | | | |
| Layer 1 | TrCH type | DCH | | | |
| | TB sizes, bit | 148 (alt 0, 148) | | | |
| | TFS   TF0, bits | 0 × 148 (alt 1 × 0) | | | |
| | TF1, bits | 1 × 148 | | | |
| | TTI, ms | 20 × Dcr = 20 × 2 | | | |
| | Coding type | CC ⅓ | | | |
| | CRC, bit | 16 | | | |
| | Max number of bits/TTI before rate matching | 516 | | | |
| | Uplink: Max number of bits/radio frame before rate matching | 258 | | | |

TABLE 2-continued

| | |
|---|---|
| RM attribute | 155 to 185 |

Table 3 shows uplink Transport Format Combination Set (TFCS) parameters in accordance with various embodiments.

TABLE 3

| | |
|---|---|
| TFCS size | 6 |
| TFCS | (RAB subflow#1, RAB subflow#2, RAB subflow#3, DCCH) = (TF0, TF0, TF0, TF0), (TF1, TF0, TF0, TF0), (TF2, TF1, TF1, TF0), (TF0, TF0, TF0, TF1), (TF1, TF0, TF0, TF1), (TF2, TF1, TF1, TF1) |

Table 4 shows uplink physical parameters in accordance with various embodiments.

TABLE 4

| | | |
|---|---|---|
| DPCH | Min spreading factor | 32 |
| Uplink | Max number of DPDCH data bits/radio frame | 1200 |
| | Puncturing Limit | 0.84 |

Table 5 shows downlink transport channel parameters for conversational/speech/DL:12.2 kbps/CS RAB in accordance with various embodiments.

TABLE 5

| Higher layer | RAB/Signalling RB | RAB subflow #1 | RAB subflow #2 | RAB subflow #3 |
|---|---|---|---|---|
| RLC | Logical channel type | | DTCH | |
| | RLC mode | TM | TM | TM |
| | Payload sizes, bit | 0 39 81 | 103 | 60 |
| | Max data rate, bps | | 12 200 | |
| | TrD PDU header, bit | | 0 | |
| MAC | MAC header, bit | | 0 | |
| | MAC multiplexing | | N/A | |
| Layer 1 | TrCH type | DCH | DCH | DCH |
| | TB sizes, bit | 0 39 81 | 103 | 60 |

TABLE 5-continued

| TFS (note 1) | TF0, bits | 1 × 0 (note 2) | 0 × 103 | 0 × 60 |
|---|---|---|---|---|
| | TF1, bits | 1 × 39 | 1 × 103 | 1 × 60 |
| | TF2, bits | 1 × 81 | N/A | N/A |
| TTI, ms | | 10 × Dcr = 10 × 2 | 10 × Dcr = 10 × 2 | 10 × Dcr = 10 × 2 |
| Coding type | | CC ⅓ | CC ⅓ | CC ½ |
| CRC, bit | | 12 | N/A | N/A |
| Max number of bits/TTI after channel coding | | 303 | 333 | 136 |
| RM attribute | | 180 to 220 | 170 to 210 | 215 to 256 |

(note 1): The TrCH corresponding to RAB subflow#1 may be used as the guiding TrCH, (see clause 4.3 in 3GPP TS 25.212).
(note 2): CRC parity bits may be attached to RAB subflow#1 any time since number of TrBlks are 1 even if there is no data on RAB subflow#1 (see clause 4.2.1.1 in 3GPP TS 25.212).

Table 6 shows transport channel parameters for DL:3.4 kbps SRBs for DCCH in accordance with various embodiments.

TABLE 6

| Higher layer | RAB/signalling RB | SRB#1 | SRB#2 | SRB#3 | SRB#4 |
|---|---|---|---|---|---|
| | User of Radio Bearer | RRC | RRC | NAS_DT High priority | NAS_DT Low priority |
| RLC | Logical channel type | DCCH | DCCH | DCCH | DCCH |
| | RLC mode | UM | AM | AM | AM |
| | Payload sizes, bit | 136 | 128 | 128 | 128 |
| | Max data rate, bps | 3 400 | 3 200 | 3 200 | 3 200 |
| | AMD/UMD PDU header, bit | 8 | 16 | 16 | 16 |
| MAC | MAC header, bit | 4 | 4 | 4 | 4 |
| | MAC multiplexing | 4 logical channel multiplexing | | | |
| Layer 1 | TrCH type | DCH | | | |
| | TB sizes, bit | 148 (alt 0, 148)(note) | | | |
| | TFS  TF0, bits | 0 × 148 (alt 1 × 0)(note) | | | |
| |  TF1, bits | 1 × 148 | | | |
| | TTI, ms | 20 × Dcr = 20 × 2 | | | |
| | Coding type | CC ⅓ | | | |
| | CRC, bit | 16 | | | |

TABLE 6-continued

| Max number of bits/ TTI before rate matching | 516 |
|---|---|
| RM attribute | 155 to 230 |

NOTE:
Alternative parameters may enable the measurement "transport channel BLER" in the UE.

Table 7 shows downlink TFCS parameters in accordance with various embodiments.

TABLE 7

| TFCS size | 6 |
|---|---|
| TFCS | (RAB subflow#1, RAB subflow#2, RAB subflow#3, DCCH) = (TF0, TF0, TF0, TF0), (TF1, TF0, TF0, TF0), (TF2, TF1, TF1, TF0), (TF0, TF0, TF0, TF1), (TF1, TF0, TF0, TF1), (TF2, TF1, TF1, TF1) |

Table 8 shows downlink physical channel parameters in accordance with various embodiments.

TABLE 8

| DPCH Downlink | DTX position | | Fixed |
|---|---|---|---|
| | Spreading factor | | 64 |
| | DPCCH | Number of TFCI bits/slot | 0 |
| | | Number of TPC bits/slot | 4 |
| | | Number of Pilot bits/slot | 8 |
| | DPDCH | Number of data bits/slot | 68 |
| | | Number of data bits/frame | 1020 |

Figure 5:
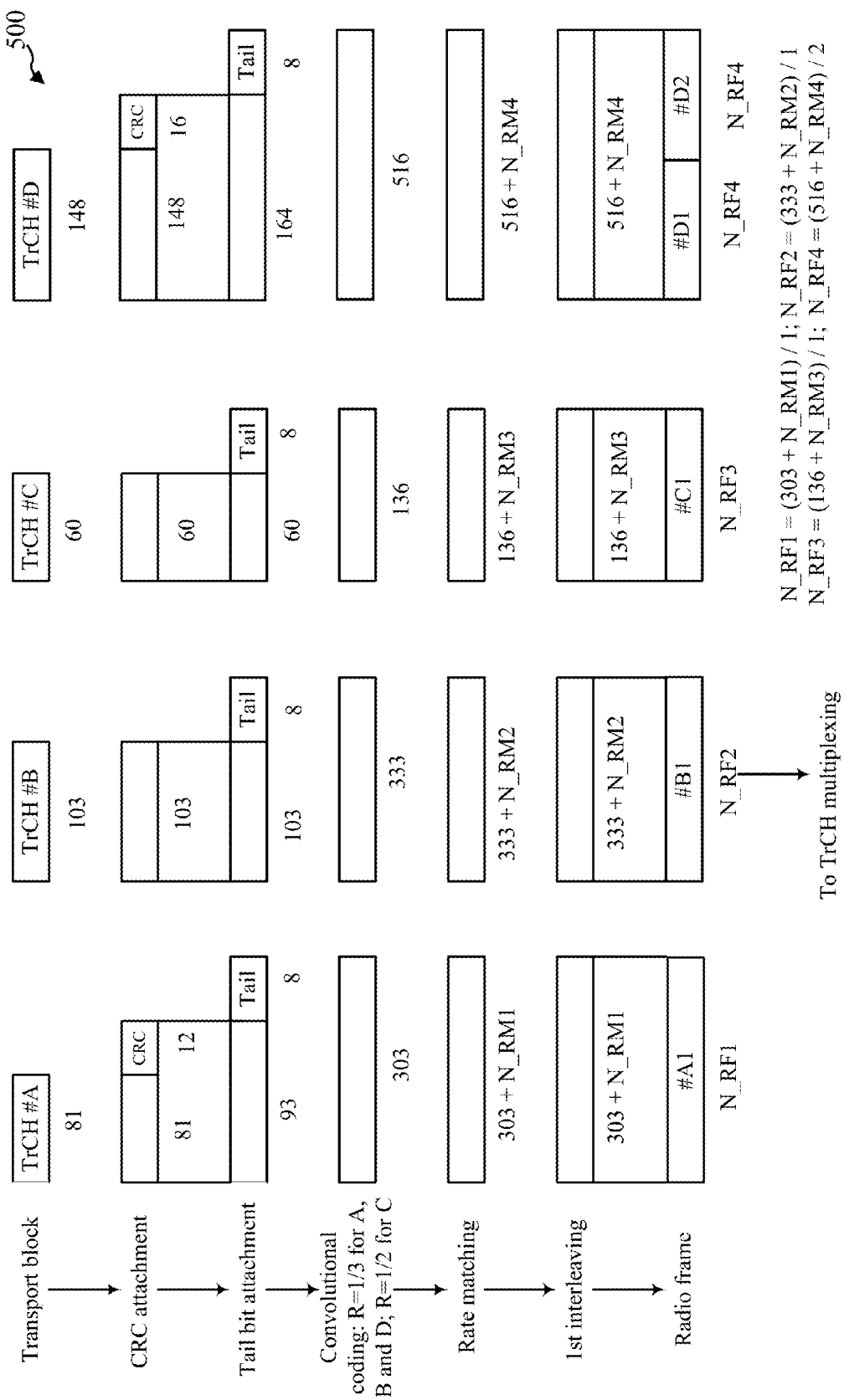
FIG. 5 illustrates a transport channel procedure for AMR DL: 12.2 kbps RAB+DL: 3.4 kbps SRB in N=2 F-UMTS in accordance with various embodiments.

FIG. 5 illustrates a transport channel procedure 500 for "AMR DL: 12.2 kbps RAB"+DL: 3.4 kbps SRB" in N=2 F-UMTS in accordance with various embodiments.

Table 9 shows DL transport channels for AMR and DCCH in N=2 F-UMTS in accordance with various embodiments.

TABLE 8

| | TrCh# A | TrCh# B | TrCh# C | TrCh# D |
|---|---|---|---|---|
| Transport Block Bits | 81 | 103 | 60 | 148 |
| CRC bits | 12 | 0 | 0 | 16 |
| Tail Bits | 8 | 8 | 8 | 8 |
| Total Bits | 101 | 111 | 60 | 172 |
| Convolutional Coding | 303 (R = ⅓) | 333 (R = ⅓) | 136 (R = ½) | 516 (R = ⅓) |
| Rate Matching | 303 + NRM1 | 333 + NRM2 | 136 + NRM3 | 516 + NRM4 |
| 1st Interleaving | 303 + NRM1 | 333 + NRM2 | 136 + NRM3 | 516 + NRM4 |
| Radio Frame Segmentation* | (303 + NRM1)/1 | (333 + NRM2)/1 | (136 + NRM3)/1 | (516 + NRM4)/2 |

During radio frame segmentation, the 10×Dcr (i.e. 10×2=20 ms) AMR TTIs may fit into 10×Dcr i.e. 10×2 ms=20 ms radio frames while the 20×Dcr (i.e., 20×2 ms)=40 ms DCCH TTI may be broken into 20 ms radio frames.

Figure 6:
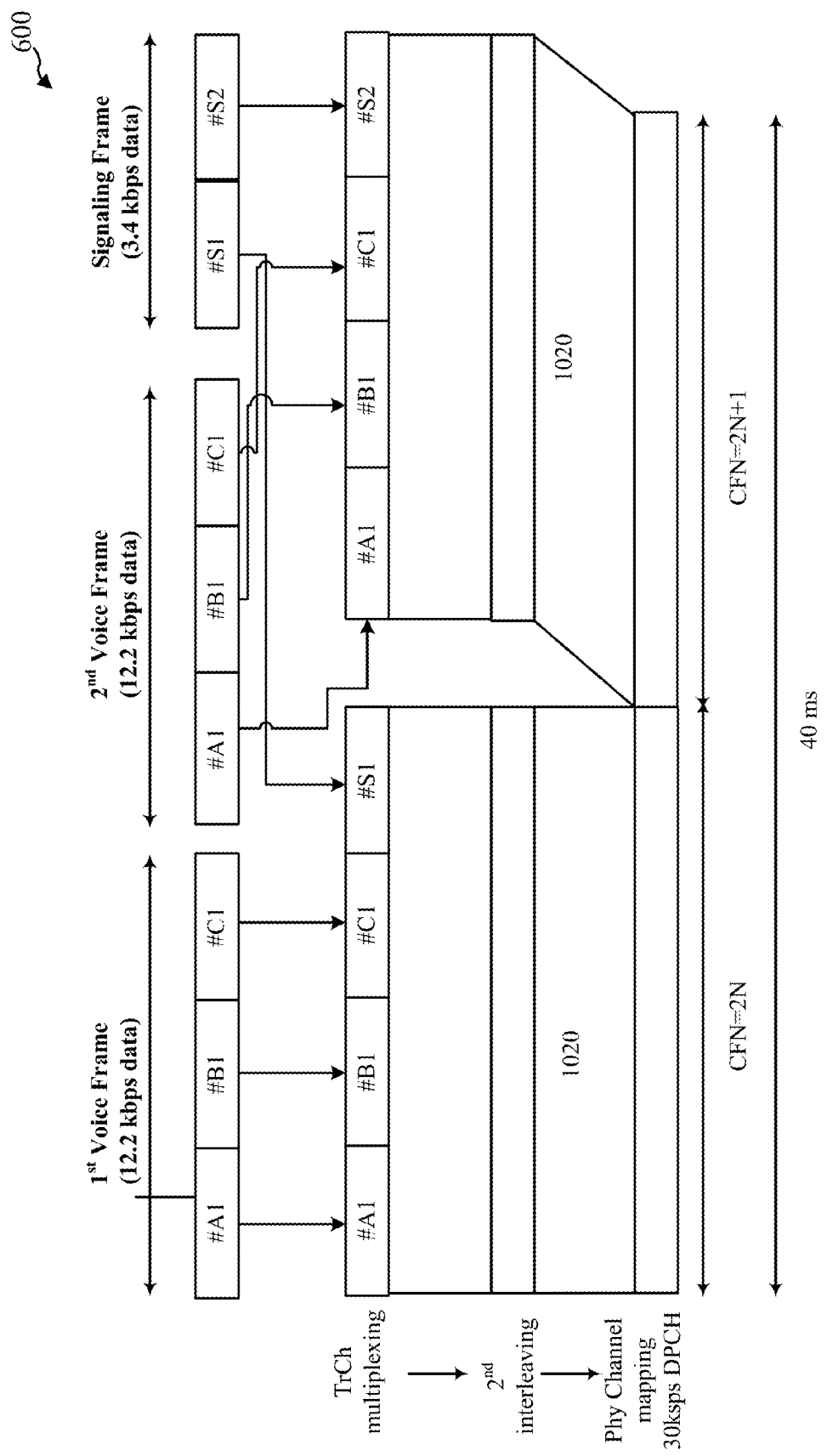
FIG. 6 shows a transport channels (TrCHs) multiplexing and mapping diagram to physical channels for AMR DL: 12.2 kbps RAB+DL: 3.4 kbps SRB in N=2 F-UMTS in accordance with various embodiments.

FIG. 6 shows a transport channels (TrCHs) multiplexing and mapping diagram 600 to physical channels for AMR DL: 12.2 kbps RAB+DL: 3.4 kbps SRB in N=2 F-UMTS in accordance with various embodiments. The TrCHs for AMR may fit into radio frames entirely while the TrCH for signaling may be broken from its TTI into 10×Dcr ms i.e. 20 ms frames. These frames may then be serially multiplexed into a Coded Composite Transport Channel (CCTrCH). Thus, each CCTrCH may contain a AMR Class-A, B, and C bit sequences, plus a portion of the signaling information. A downlink DPCH with 120/Dcr i.e. 120/2=60 kbps may be allocated to carry one CCTrCH. It may be noted that the contexts and figures shown here may only refer to one of the six transport format combinations (TFCs):
(RAB subflow#1, RAB subflow#2, RAB subflow#3, DCCH)= (TF2, TF1, TF1, TF1).

A second round of interleaving may be done on the CCTrCh. The 510×Dcr i.e. 1020 coded bits per radio frame may include CRC and tail bits, rate ½ or ⅓ bits-to-coded bits coding, and rate matching. Then the coded bits may go through serial-to-parallel conversion and are placed onto a 60/Dcr (i.e., 60/2=30) ksps DPDCH.

In some embodiments, the downlink slot format is 8; this is SF 64 and no TFCI bits. There may be 1020 data bits in a 10×Dcr (i.e., 20) ms radio frame. Using the TTI of each of the four transport channels, the above bits may match 1020 (i.e., 312+328+166+428/2=1020).

In downlink, DPCCH and DPDCH being time multiplexed as DPCH, may use same spreading factor. Table 10 shows DL slot format for DPDCH and DPCCH fields in accordance with various embodiments.

the number of bits may be exactly equal for N=1 and N=2 as there is no difference in processing till radio frame segmentation. As a result, RM attributes may stay the same for N=2 as in N=1.

Table 11 shows UL slot format for DPDCH fields in accordance with various embodiments.

TABLE 11

| Slot Format #i | Channel Bitrate (kbps) | Channel Symbol Rate (ksps) | SF | Bits/ Frame | Bits/ Slot | Ndata |
|---|---|---|---|---|---|---|
| 2 | 120/Dcr = 60 | 120/Dcr = 60 | 32 | 1200 | 80 | 80 |
| 3 | 240/Dcr = 120 | 240/Dcr = 120 | 16 | 2400 | 160 | 160 |

It may be noted that the slot formats used in the above Table 11 may correspond to slot formats 3 and 4 respectively used

TABLE 10

| Slot Format #i | Channel Bitrate (kbps) | Channel Symbol Rate (ksps) | SF | Bits/ Slot | DPCCH Bits/Slot NTPC | DPCCH Bits/Slot NTFCI | DPCCH Bits/Slot NPilot | DPDCH Bits/Slot NData1 | DPDCH Bits/Slot NData2 | Transmit slots per radio frame |
|---|---|---|---|---|---|---|---|---|---|---|
| 8 | 120/Dcr = 60 | 60/Dcr-30 | 64 | 80 | 4 | 0 | 8 | 12 | 56 | 15 |
| 8B | 240/Dcr = 120 | 120/Dcr = 60 | 32 | 160 | 8 | 0 | 16 | 24 | 112 | 8-14 |

It may be noted that the slot format 8 used in the above table may correspond to slot format 8B in DL DPDCH+DPCCH used in current UMTS specification for compressed mode. For N=2 F-UMTS system, as there is less bandwidth and the timing and bit requirements of AMR 12.2 kbps is same, the spreading factor may be reduced to increase the bits/slot and accordingly bits/frame. However, the channel bitrate or channel symbols rate may stay unchanged as time is dilated for N=2 F-UMTS. The rate matching tuning method may also stay unchanged in N=2 F-UMTS as compared to normal UMTS (i.e., N=1 UMTS).

in UL DPDCH current UMTS system. For N=2 F-UMTS system, as there is less bandwidth and the timing and bit requirements of AMR 12.2 kbps is same, the spreading factor may be reduced to increase the bits/slot and accordingly bits/frame. However, the channel bitrate or channel symbols rate may stay unchanged as time is dilated for N=2 F-UMTS. The rate matching tuning method may stay unchanged in N=2 F-UMTS as compared to normal UMTS (i.e., N=1 UMTS).

Table 12 shows UL slot format for DPCCH field in accordance with various embodiments.

TABLE 12

| Slot Format #i | Channel Bitrate (kbps) | Channel Symbol Rate (ksps) | SF | Bits/ Frame | Bits/ Slot | NPilot | NTPC | NTFCI | NFBI | Transmit slots per radio frame |
|---|---|---|---|---|---|---|---|---|---|---|
| 0 | 15/Dcr = 7.5 | 15/Dcr = 7.5 | 256 | 150 | 10 | 6 | 2 | 2 | 0 | 15 |
| 0A | 15/Dcr = 7.5 | 15/Dcr = 7.5 | 256 | 150 | 10 | 5 | 2 | 3 | 0 | 10-14 |
| 0B | 15/Dcr = 7.5 | 15/Dcr = 7.5 | 256 | 150 | 10 | 4 | 2 | 4 | 0 | 8-9 |

Similarly, the slot format 8B used in the Table 10 may not correspond to any slot format in used in current UMTS system. Also, there are slot formats 12B, 13 and 13A (all have SF 32) in the UMTS specification and these may also be used. However, as the data bits may not exactly be the same as slot format 8B in the above table, RM attributes may be modified in that case. If slot format 12B is used, then if 16 TFCI bits are not used, then DTX may be used in TFCI field. Thus, slot format 8B as defined in Table 10 may use the 16 TFCI bits of slot format 12B as data bits.

Rate Matching may be done before radio frame segmentation in the DL for N=1 (for N=2, radio frame segmentation is not needed for TrCh# A, TrCh# B and TrCh# C). At this point, It may be noted that the slot formats 0, 0A and 0B in the Table 12 may correspond to slot formats 0, 0A and 0B respectively used in UL DPDCH of current UMTS system for normal mode.

For UL DPCCH, all slot formats may have Spreading Factor 256. Hence the bits/slot and bits/frame may stay the same and channel bitrate and channel symbols rates may be scaled down by Dcr. As a result, the TPC rate may be reduced from 1500 Hz in N=1 UMTS to 1500/Dcr (i.e., 750 Hz in N=2 F-UMTS).

There may be 32 TFCI encoded bits that may need to be transmitted at least once every 20 ms (every voice frame). As per 3GPP TS 25.212, Multiplexing and channel coding (FDD) (Release 8), incorporated by reference herein for all purposes, Section 4.3.3, the TFCI may be encoded using a (32, 10) sub-code of the second order Reed-Muller code. If the TFCI consist of less than 10 bits, it may be padded with zeros to 10 bits, by setting the most significant bits to zero. The length of the TFCI code word may be 32 bits.

Section 4.3.5.1 of 3GPP TS 25.212 mentions that the bits of the code word are directly mapped to the slots of the radio frame. Within a slot the bit with lower index may be transmitted before the bit with higher index. The coded bits bk may be mapped to the transmitted TFCI bits dk, according to the following formula:

$$d_k = b_k \bmod 32.$$

For uplink physical channels regardless of the SF bits b30 and b31 of the TFCI code word may not be transmitted.

Using slot format 0 in Table 10, there may be 2×15=30 TFCI encoded bits every frame duration of 10×Dcr (i.e., 20 ms). Therefore, bits b30 and b31 of the TFCI code word may not be transmitted.

Section 4.3.5.2 of 3GPP TS 25.212 mentions that for uplink compressed mode, the slot format may be changed so that no TFCI coded bits are lost. The different slot formats in compressed mode may not match the exact number of TFCI coded bits for all possible TGLs. Repetition of the TFCI bits may therefore be used.

In DL, DPCCH and DPDCH may be time multiplexed as DPCH, and use the same spreading factor. The number of bits in the downlink DPCCH fields using modified slot format 8 may be shown in Table 11 for N=2 F-UMTS.

For the slot format used, the number of TFCI bits may be zero. Hence, unlike uplink in some cases, no special handling of TFCI may be necessary. In some embodiments, the TPC and pilot bits can be simply obtained by repeating the basic patterns defined in 3GPP TS 25.211, Table 12-13.

Generally, reduction in spreading factor may have impacts on the link budget. In order to compensate for spreading factor reduction and to maintain the same voice service coverage, transmission power may be increased from that corresponding to same PSD for F-UMTS.

Once the first voice frame (equivalently 20 ms long) is available at the MAC, it may be delivered to the PHY. After some PHY layer processing (assuming processing time does not scale with Dcr), the over-the-air transmission may be allowed to start only at the next radio frame boundary due to the current spec restriction. However, for N=2 F-UMTS system, as the TTI may be 10×Dcr=20 ms and the radio frame may also be 10×Dcr=20 ms, there may be no additional latency compared to normal UMTS system (i.e., N=1). It may be noted that in computing the additional latency for voice over N=2 F-UMTS, the processing delay may be assumed to remain constant as in normal UMTS (i.e., N=1).

Some embodiments for AMR 7.95 kbps for N=2 F-UMTS may be similar to that for AMR 12.2 kbps and hence not described in detail. The slot formats used may be same as in AMR 12.2 kbps even though the number of Class A, B and C bits may be different in AMR 7.95 from AMR 12.2.

Some embodiments provide for AMR 12.2 kbps for N=4 F-UMTS. One voice frame may be still mapped to a 20 ms time window upon transmission, irrespective of N or Dcr in F-UMTS. Similar transmission scheme as for N=2 may be utilized in order to maintain the same voice quality in an N=4 F-UMTS system (i.e., keep the information data rate the same as that of the normal mode (e.g., 12.2 kbps):

Spreading factor reduction by Dcr (i.e., Dcr=4) in both DL and UL and rate matching tuning;

4 SRBs→4 DCCHs→1 DCH using 10×Dcr i.e. 10×4 ms=40 ms TTI;

1 RAB→3 DTCHs→3 DCHs using 10×Dcr i.e. 10×4 ms=40 ms TTI.

This scheme may be applied to both the mobile device (e.g., UE) and base station (e.g., NodeB).

This section addresses the configurations of the dedicated physical data channel (DPDCH) for both the uplink and downlink with a N=4 F-UMTS system in accordance with various embodiments. For the normal operating mode (i.e., N=1), let $SF_{norm}$ be the spreading factor. According to 3GPP TS34.108, Section 6.10.2.4.1.4, $SF_{norm, UL}$=64 for uplink and $SF_{norm, DL}$=128 for downlink. For the N=4 F-UMTS system, the spreading factor may be calculated as below so that the number of channel bits per 20 ms can stay unchanged:

$$SF_{flex} = \frac{SF_{norm}}{D_{cr}}.$$

It may be noted that for N=4 F-UMTS, Dcr=4 in some embodiments.

Table 13 provides transport channel parameters for conversational/speech/UL:12.2 kbps/CS RAB in accordance with various embodiments.

TABLE 13

| Higher layer | RAB/Signalling RB | RAB subflow #1 | RAB subflow #2 | RAB subflow #3 |
|---|---|---|---|---|
| RLC | Logical channel type |  | DTCH |  |
|  | RLC mode | TM | TM | TM |
|  | Payload sizes, bit | (39), (81), (39 + 39), (39 + 81), (81 + 81) [alt (0 + 0), (0 + 39), (0 + 81), (39 + 39), (39 + 81), (81 + 81)] | (103 + 0), (103 + 103) | (60 + 0), (60 + 60) |
|  | Max data rate, bps |  | 12 200 |  |
|  | TrD PDU header, bit |  | 0 |  |
| MAC | MAC header, bit |  | 0 |  |
|  | MAC multiplexing |  | N/A |  |
| Layer 1 | TrCH type | DCH | DCH | DCH |
|  | TB sizes, bit | (39), (81), (39 + 39), (39 + 81), (81 + 81) [alt (0 + 0), (0 + 39), (0 + 81), (39 + | (103 + 0), (103 + 103) | (60 + 0), (60 + 60) |

TABLE 13-continued

|  |  | 39), (39 + 81), (81 + 81)] |  |  |
|---|---|---|---|---|
| TFS | TF0, bits | 0 × 81, 0 × 81 alt (1 × 0, 1 × 0) - see note | 0 × 103, 0 × 103 | 0 × 60, 0 × 60 |
|  | TF1, bits | 0 × 81, 1 × 39 (alt 1 × 0, 1 × 39) - see note | 0 × 103, 1 × 103 | 0 × 60, 1 × 60 |
|  | TF2, bits | 0 × 81, 1 × 81 (alt 1 × 0, 1 × 81) - see note | 1 × 103, 0 × 103 | 1 × 60, 0 × 60 |
|  | TF3, bits | 1 × 39, 0 × 81 (alt 1 × 39, 1 × 0) - see note | 1 × 103, 1 × 103 | 1 × 60, 1 × 60 |
|  | TF4, bits | 1 × 39, 1 × 39 | N/A | N/A |
|  | TF5, bits | 1 × 39, 1 × 81 | N/A | N/A |
|  | TF6, bits | 1 × 81, 0 × 81 (1 × 81, 1 × 0) - see note | N/A | N/A |
|  | TF7, bits | 1 × 81, 1 × 39 | N/A | N/A |
|  | TF8, bits | 1 × 81, 1 × 81 | N/A | N/A |
| TTI, ms |  | 10 × Dcr = 10 × 4 | 10 × Dcr = 10 × 4 | 10 × Dcr = 10 × 4 |
| Coding type |  | CC 1/3 | CC 1/3 | CC 1/2 |
| CRC, bit |  | 12 | N/A | N/A |
| Max number of bits/TTI after channel coding |  | 582 | 642 | 256 |
| Uplink: Max number of bits/radio frame before rate matching |  | 582 | 642 | 256 |
| RM attribute |  | 180 to 220 | 170 to 210 | 215 to 256 | note: In case of using this alternative, 2 CRC parity bits may be attached to RAB subflow #1 any time since number of TrBlks are 1 even if there is no data on RAB subflow #1 (see clause 4.2.1.1 in 3GPP TS 25.212). RM attribute may change.
A Silence Descriptor frame may be sent once every 160 ms during silence to provide comfort noise. Hence TF4 (1 × 39, 1 × 39) may not occur over 10 × Dcr = 40 ms.
TF5 (1 × 39, 1 × 81) might not occur because when the operation transitions from 'silence period' to 'talk period', there is typically a delay of 'X' ms where 'X' >20 ms.

Table 14 provides transport channel parameters for UL:3.4 kbps SRBs for DCCH in accordance with various embodiments.

TABLE 14

| Higher layer | RAB/signalling RB | SRB#1 | SRB#2 | SRB#3 | SRB#4 |
|---|---|---|---|---|---|
|  | User of Radio Bearer | RRC | RRC | NAS_DT High priority | NAS_DT Low priority |
| RLC | Logical channel type | DCCH | DCCH | DCCH | DCCH |
|  | RLC mode | UM | AM | AM | AM |
|  | Payload sizes, bit | 136 | 128 | 128 | 128 |
|  | Max data rate, bps | 3 400 | 3 200 | 3 200 | 3 200 |
|  | AMD/UMD PDU header, bit | 8 | 16 | 16 | 16 |
| MAC | MAC header, bit | 4 | 4 | 4 | 4 |
|  | MAC multiplexing | 4 logical channel multiplexing | | | |
| Layer 1 | TrCH type | DCH | | | |
|  | TB sizes, bit | 148 (alt 0, 148) | | | |
|  | TFS TF0, bits | 0 × 516 (alt 1 × 0) | | | |
|  | TF1, bits | 1 × 516 | | | |
|  | TTI, ms | 10 × Dcr = 10 × 4 | | | |
|  | Coding type | CC 1/3 | | | |
|  | CRC, bit | 16 | | | |
|  | Max number of bits/TTI before rate matching | 516 | | | |
|  | Uplink: Max number of bits/radio frame before rate matching | 516 | | | |
|  | RM attribute | 155 to 185 | | | |

Table 15 provides uplink TFCS parameters in accordance with various embodiments.

TABLE 15

| TFCS size | 18 |
|---|---|
| TFCS | (RAB subflow#1, RAB subflow#2, RAB subflow#3, DCCH) = (TF0, TF0, TF0, TF0), (TF1, TF0, TF0, TF0), (TF2, TF1, TF1, TF0), (TF0, TF0, TF0, TF1), (TF1, TF0, TF0, TF1), (TF2, TF1, TF1, TF1) (TF3, TF0, TF0, TF0), (TF4, TF0, TF0, TF0), (TF5, TF1, TF1, TF0), (TF3, TF0, TF0, TF1), (TF4, TF0, TF0, TF1), (TF5, TF1, TF1, TF1) (TF6, TF2, TF2, TF0), (TF7, TF2, TF2, TF0), (TF8, TF3, TF3, TF0), (TF6, TF2, TF2, TF1), (TF7, TF2, TF2, TF1), (TF8, TF3, TF3, TF1) |

Table 16 provides uplink physical channel parameters in accordance with various embodiments.

TABLE 16

| DPCH | Min spreading factor | 16 |
|---|---|---|
| Uplink | Max number of DPDCH data bits/radio frame | 2400 |
|  | Puncturing Limit | 0.84 |

Table 17 provides downlink transport channel parameters for conversational/speech/DL:12.2 kbps/CS RAB in accordance with various embodiments.

TABLE 17

| Higher layer | RAB/Signalling RB | | RAB subflow #1 | RAB subflow #2 | RAB subflow #3 |
|---|---|---|---|---|---|
| RLC | Logical channel type | | | DTCH | |
| | RLC mode | | TM | TM | TM |
| | Payload sizes, bit | | (39), (81), (39 + 39), (39 + 81), (81 + 81) [alt (0 + 0), (0 + 39), (0 + 81), (39 + 39), (39 + 81), (81 + 81)] | (103 + 0), (103 + 103) | (60 + 0), (60 + 60) |
| | Max data rate, bps | | | 12 200 | |
| | TrD PDU header, bit | | | 0 | |
| MAC | MAC header, bit | | | 0 | |
| | MAC multiplexing | | | N/A | |
| Layer 1 | TrCH type | | DCH | DCH | DCH |
| | TB sizes, bit | | (39), (81), (39 + 39), (39 + 81), (81 + 81) [alt (0 + 0), (0 + 39), (0 + 81), (39 + 39), (39 + 81), (81 + 81)] | (103 + 0), (103 + 103) | (60 + 0), (60 + 60) |
| | TFS (note 1) | TF0, bits | 0 × 81, 0 × 81 [alt 1 × 0, 1 × 0] - see note | 0 × 103, 0 × 103 | 0 × 60, 0 × 60 |
| | | TF1, bits | 0 × 81, 1 × 39 [alt 1 × 0, 1 × 39] - see note | 0 × 103, 1 × 103 | 0 × 60, 1 × 60 |
| | | TF2, bits | 0 × 81, 1 × 81 [alt 1 × 0, 1 × 81] - see note | 1 × 103, 0 × 103 | 1 × 60, 0 × 60 |
| | | TF3, bits | 1 × 39, 0 × 81 [alt 1 × 39, 1 × 0] - see note | 1 × 103, 1 × 103 | 1 × 60, 1 × 60 |
| | | TF4, bits | 1 × 39, 1 × 39 | N/A | N/A |
| | | TF5, bits | 1 × 39, 1 × 81 | N/A | N/A |
| | | TF6, bits | 1 × 81, 0 × 81 [alt 1 × 81, 0 × 81] - see note | N/A | N/A |
| | | TF7, bits | 1 × 81, 1 × 39 | N/A | N/A |
| | | TF8, bits | 1 × 81, 1 × 81 | N/A | N/A |
| | TTI, ms | | 10 × Dcr = 10 × 4 | 10 × Dcr = 10 × 4 | 10 × Dcr = 10 × 4 |
| | Coding type | | CC 1/3 | CC 1/3 | CC 1/2 |
| | CRC, bit | | 12 | N/A | N/A |
| | Max number of bits/TTI after channel coding | | 582 | 642 | 256 |
| | RM attribute | | 180 to 220 | 170 to 210 | 215 to 256 | note 1: The TrCH corresponding to RAB subflow #1 may be used as the guiding TrCH, (see clause 4.3 in 3GPP TS 25.212 [14]).
note 2: 2 CRC parity bits may be attached to RAB subflow #1 any time since number of TrBlks are 1 even if there is no data on RAB subflow #1 (see clause 4.2.1.1 in 3GPP TS 25.212). RM attribute may change.
A Silence Descriptor frame may be sent once every 160 ms during silence to provide comfort noise. Hence TF4 (1 × 39, 1 × 39) may not occur over 10 × Dcr = 40 ms.
TF5 (1 × 39, 1 × 81) might not occur because when the operation transitions from 'silence period' to 'talk period', there is typically a delay of 'X' ms where 'X' >20 ms.

Table 18 provides downlink transport channel parameters for DL:3.4 kbps SRBs for DCCH in accordance with various embodiments.

TABLE 18

| Higher layer | RAB/signalling RB | | SRB#1 | SRB#2 | SRB#3 | SRB#4 |
|---|---|---|---|---|---|---|
| | User of Radio Bearer | | RRC | RRC | NAS_DT High priority | NAS_DT Low priority |
| RLC | Logical channel type | | DCCH | DCCH | DCCH | DCCH |
| | RLC mode | | UM | AM | AM | AM |
| | Payload sizes, bit | | 136 | 128 | 128 | 128 |
| | Max data rate, bps | | 3 400 | 3 200 | 3 200 | 3 200 |
| | AMD/UMD PDU header, bit | | 8 | 16 | 16 | 16 |
| MAC | MAC header, bit | | 4 | 4 | 4 | 4 |
| | MAC multiplexing | | 4 logical channel multiplexing | | | |
| Layer 1 | TrCH type | | DCH | | | |
| | TB sizes, bit | | 148 (alt 0, 148)(note) | | | |
| | TFS | TF0, bits | 0 × 516 (alt 1 × 0)(note) | | | |
| | | TF1, bits | 1 × 516 | | | |
| | TTI, ms | | 10 × Dcr = 10 × 4 | | | |
| | Coding type | | CC 1/3 | | | |
| | CRC, bit | | 16 | | | |
| | Max number of bits/TTI before rate matching | | 516 | | | |
| | RM attribute | | 155 to 230 | | | |

NOTE:
Alternative parameters may enable the measurement "transport channel BLER" in the UE.

Table 19 provides downlink TFCS parameters in accordance with various embodiments.

TABLE 19

| TFCS size | 18 |
|---|---|
| TFCS | (RAB subflow #1, RAB subflow #2, RAB subflow #3, |

TABLE 19-continued

DCCH) = (TF0, TF0, TF0, TF0), (TF1, TF0, TF0, TF0),
(TF2, TF1, TF1, TF0), (TF0, TF0, TF0, TF1),
(TF1, TF0, TF0, TF1), (TF2, TF1, TF1, TF1)
(TF3, TF0, TF0, TF0), (TF4, TF0, TF0, TF0),
(TF5, TF1, TF1, TF0), (TF3, TF0, TF0, TF1),
(TF4, TF0, TF0, TF1), (TF5, TF1, TF1, TF1)
(TF6, TF2, TF2, TF0), (TF7, TF2, TF2, TF0),
(TF8, TF3, TF3, TF0), (TF6, TF2, TF2, TF1),
(TF7, TF2, TF2, TF1), (TF8, TF3, TF3, TF1)

Table 20 provides downlink physical channel parameters in accordance with various embodiments.

TABLE 20

| DPCH | DTX position | | Fixed |
|---|---|---|---|
| Downlink | Spreading factor | | 32 |
| | DPCCH | Number of TFCI bits/slot | 0 |
| | | Number of TPC bits/slot | 8 |
| | | Number of Pilot bits/slot | 16 |
| | DPDCH | Number of data bits/slot | 136 |
| | | Number of data bits/frame | 2040 |

Figure 7:
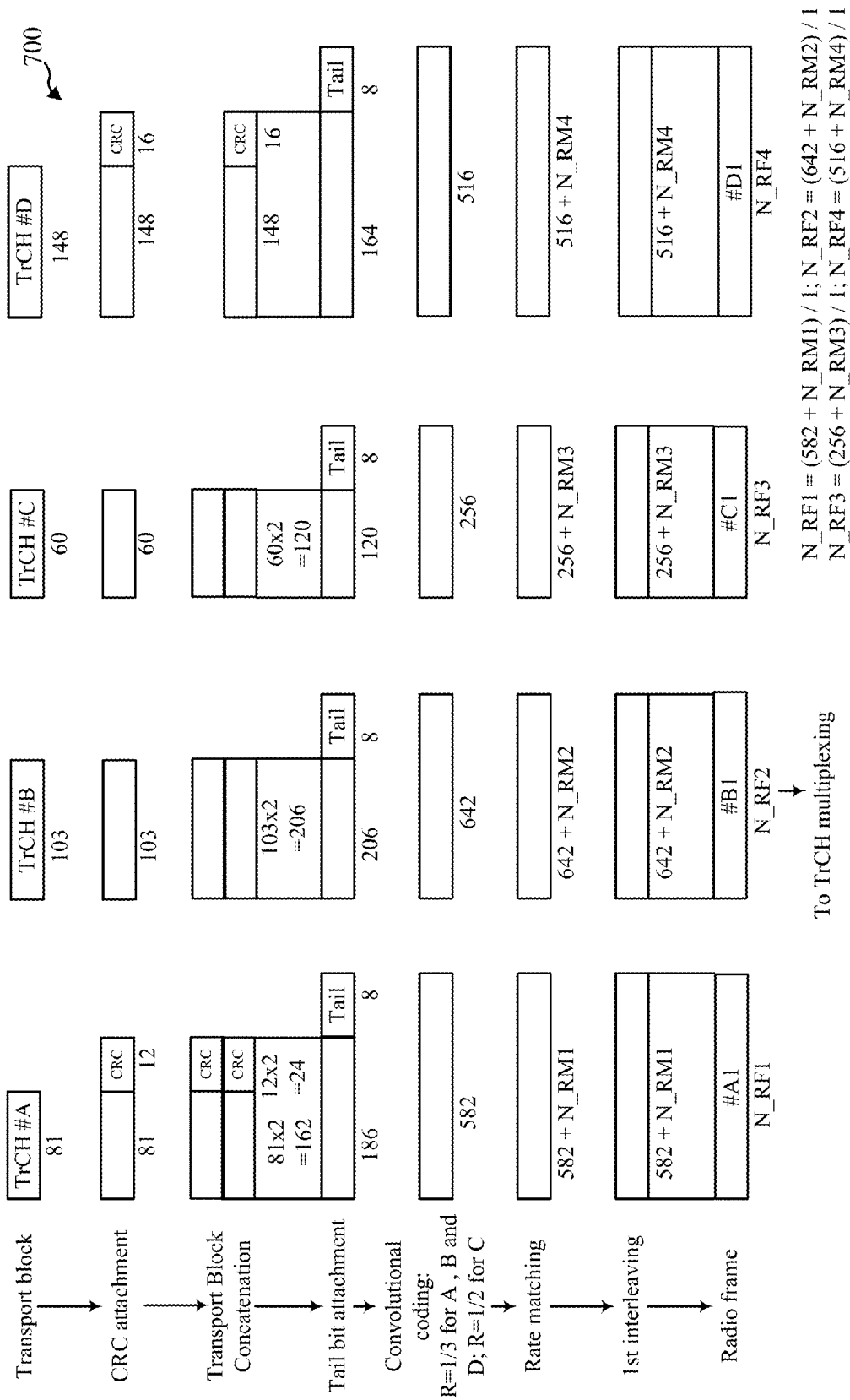
FIG. 7 illustrates a transport channel procedure for AMR DL: 12.2 kbps RAB+DL: 3.4 kbps SRB in N=4 F-UMTS in accordance with various embodiments.

FIG. 7 illustrates a transport channel procedure 700 for AMR DL: 12.2 kbps RAB"+DL: 3.4 kbps SRB in N=4 F-UMTS in accordance with various embodiments.

Table 21 provides information regarding DL transport channels for AMR and DCCH in N=2 F-UMTS in accordance with various embodiments.

TABLE 21

| | TrCh# A | TrCh# B | TrCh# C | TrCh# D |
|---|---|---|---|---|
| Transport Block Bits | 81 | 103 | 60 | 148 |
| CRC bits | 12 | 0 | 0 | 16 |
| Transport Block Concatenation | (81 + 12) × 2 | (103 + 0) × 2 | (60 + 0) × 2 | 148 × 1 |
| Tail Bits | 8 | 8 | 8 | 8 |
| Total Bits | 194 | 214 | 128 | 172 |
| Convolutional Coding | 582 (R = ⅓) | 642 (R = ⅓) | 256 (R = ½) | 516 (R = ⅓) |
| Rate Matching | 582 + NRM1 | 642 + NRM2 | 256 + NRM3 | 516 + NRM4 |
| 1$^{st}$ Interleaving | 582 + NRM1 | 642 + NRM2 | 256 + NRM3 | 516 + NRM4 |
| Radio Frame Segmentation | (582 + NRM1)/1 | (642 + NRM2)/1 | (256 + NRM3)/1 | (516 + NRM4)/1 |

In some embodiments, during radio frame segmentation, the 10×Dcr ms (i.e., 10×4)=40 ms AMR TTIs and DCCH TTI fit into 10×Dcr ms (i.e., 10×4 ms)=40 ms radio frames.

Figure 8:
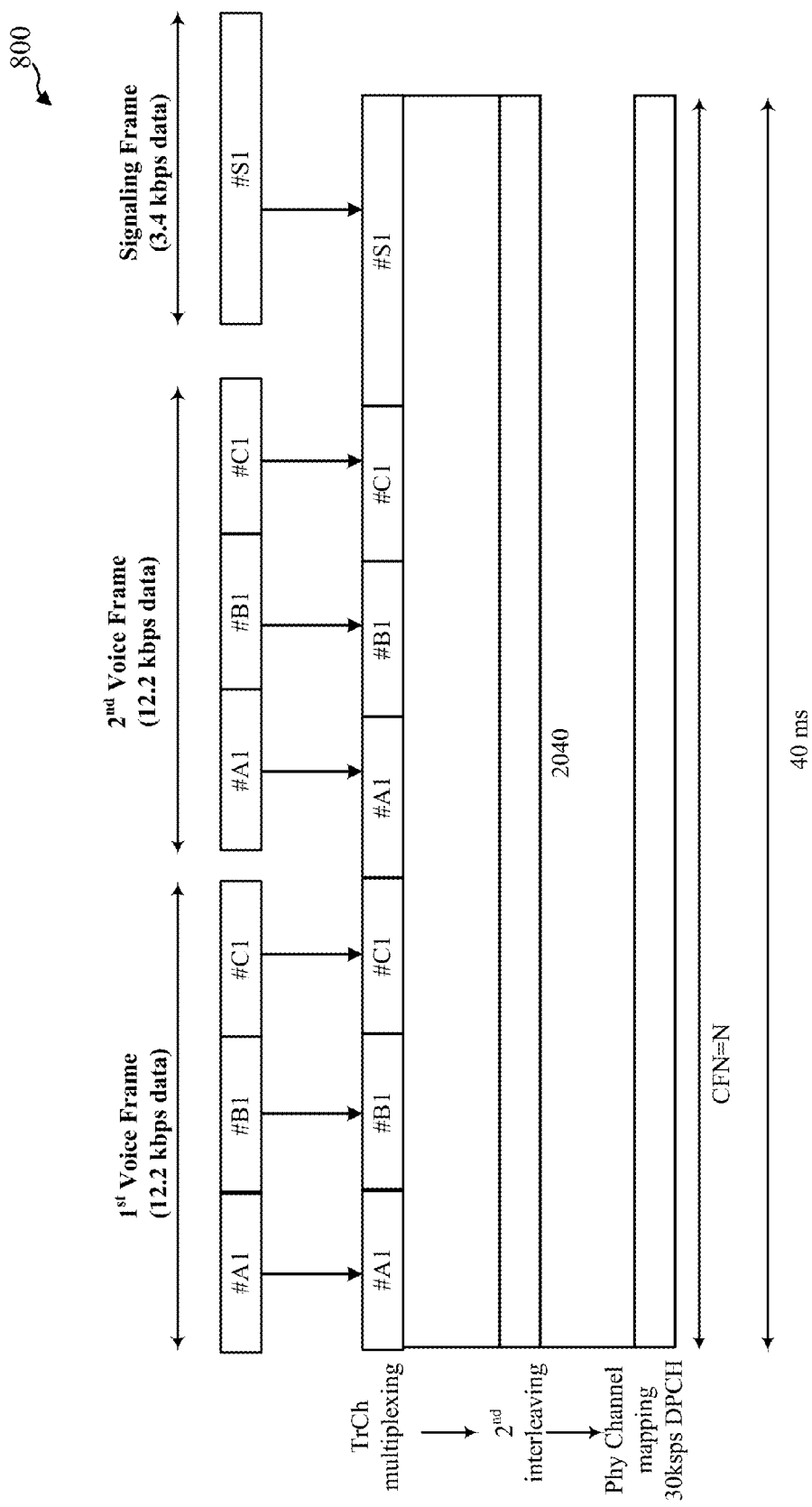
FIG. 8 shows a transport channels multiplexing and mapping diagram to physical channels for AMR DL: 12.2 kbps RAB+DL: 3.4 kbps SRB in N=4 F-UMTS in accordance with various embodiments.

FIG. 8 shows a transport channels (TrCHs) multiplexing and mapping diagram 800 to physical channels for AMR DL: 12.2 kbps RAB+DL: 3.4 kbps SRB in N=2 F-UMTS in accordance with various embodiments. The individual TrCHs may fit into 10×Dcr ms (i.e., 40 ms frames). These frames may then serially be multiplexed into a Coded Composite Transport Channel (CCTrCH). Thus, each CCTrCH may contain two AMR Class-A, B, and C bit sequences, plus signaling information. A downlink DPCH with 240/Dcr (i.e., 240/4)= 60 kbps may be allocated to carry one CCTrCH. It may be noted that the contexts and figures shown here may only refer to one of the eighteen transport format combinations (TFCs): (RAB subflow#1, RAB subflow#2, RAB subflow#3, DCCH)= (TF8, TF3, TF3, TF1).

A second round of interleaving may be done on the CCTrCh. The 510×Dcr (i.e., 2040) coded bits per radio frame include CRC and tail bits, rate ½ or ⅓ bits-to-coded bits coding, and rate matching. Then the coded bits may go through serial-to-parallel conversion and are placed onto a 120/Dcr (i.e., 120/4)=30 ksps DPDCH. In downlink, DPCCH and DPDCH being time multiplexed as DPCH, may use same spreading factor.

Table 22 provides information regarding DL slot format for DPDCH and DPCCH fields in accordance with various embodiments.

TABLE 22

| Slot Format #i | Channel Bitrate (kbps) | Channel Symbol Rate (ksps) | SF | Bits/ Slot | DPCCH Bits/Slot | | | DPDCH Bits/Slot | | Transmit slots per radio frame |
|---|---|---|---|---|---|---|---|---|---|---|
| | | | | | NTPC | NTFCI | NPilot | NData1 | NData2 | |
| 8 | 240/Dcr = 60 | 120/Dcr = 30 | 32 | 160 | 8 | 0 | 16 | 24 | 112 | 15 |
| 8B | 480/Dcr = 120 | 240/Dcr = 60 | 16 | 320 | 16 | 0 | 32 | 48 | 224 | 8-14 |

It may be noted that the slot format 8 used in the above Table 22 may not correspond to any slot format in DL DPDCH+DPCCH used in current UMTS specification. However, it may correspond to slot format 8B in DL DPDCH+ DPCCH proposed for N=2 F-UMTS in Table 10 for compressed mode. Alternatively, slot formats 12B, 13 or 13A (all have SF 32) in the UMTS specification may also be used in some embodiments if the same are used for N=2 F-UMTS DL DPDCH+DPCCH for compressed mode. However, as the data bits may not exactly the same as slot format 8A in the above table, RM attributes may be modified in that case. For N=4 F-UMTS system, as there is less bandwidth and the timing and bit requirements of AMR 12.2 kbps may be the same, the spreading factor may be reduced to increase the bits/slot and accordingly bits/frame. However, the channel bitrate or channel symbols rate may stay unchanged as time is dilated for N=4 F-UMTS. The rate matching tuning method also may stay almost unchanged in N=4 F-UMTS as compared to normal UMTS (i.e., N=1 UMTS or N=2 F-UMTS).

Similarly, the slot format 8B used in the above Table 22 may not correspond to any slot format in used in current UMTS system. Also, there is slot format 13B (have SF 16) in the UMTS specification and it may also be used. However, as the data bits may not be exactly the same as slot format 8B in the above table, RM attributes may be modified in that case. If slot format 13B is used, then if 16 TFCI bits may not be used, then DTX may be used in TFCI field.

As the number of TFCs may have increased from 6 to 18 due to two voice frames being packed in one radio frame, BTFD in DL may take more processing time. As the additional processing time may be difficult to meet the timing requirements for voice, slot format 12B (or 13 or 13A) may be used as that has TFCI fields. In that case, BTFD may not be done as TFCI is present. The reason BTFD may be done in DL in normal UMTS is during Downlink AMR voice, because if the TFCI field was sent, the SF may have to be lower and lower SFs for voice provide a greater potential to run out of OVSF codes.

For N=4 F-UMTS, as the Tail bits may be getting added to the concatenated transport blocks only once, in one radio frame of 10×Dcr ms (i.e., 40 ms) there may be 8×3=24 less bits for TrCh# A (RAB subflow#1) and TrCh# B (RAB subflow#2) that use R=⅓ coding and 8×2=16 bits less for TrCh# C (RAB subflow#3) that use R=½ coding compared to N=1 or N=2 cases in 40 ms for the worst case TFC. Thus there may be 24+24+15=64 less bits in N=4 and this may help to some extent to compensate for the loss of 16 data bits per slot (16×15=240 bits in one radio frame of 40 ms long) in slot format 12B in UMTS specification compared to slot format 8 in Table 22. However, RM attributes may be modified if slot format 12B in UMTS specification is used instead of slot format 8 in Table 22.

Table 23 provides information regarding UL slot format for DPDCH fields in accordance with various embodiments.

TABLE 23

| Slot Format #i | Channel Bitrate (kbps) | Channel Symbol Rate (ksps) | SF | Bits/Frame | Bits/Slot | Ndata |
|---|---|---|---|---|---|---|
| 2 | 240/Dcr = 60 | 120/Dcr = 60 | 16 | 2400 | 160 | 160 |
| 3 | 480/Dcr = 120 | 240/Dcr = 120 | 8 | 4800 | 320 | 320 |

It may be noted that the slot formats used in the above Table 23 may correspond to slot formats 4 and 5 respectively used in UL DPDCH current UMTS system. For N=4 F-UMTS system, as there is less bandwidth and the timing and bit requirements of AMR 12.2 kbps may be the same, the spreading factor may be reduced to increase the bits/slot and accordingly bits/frame. However, the channel bitrate or channel symbols rate may stay unchanged as time is dilated for N=4 F-UMTS. The rate matching tuning method may stay almost unchanged in N=4 F-UMTS as compared to normal UMTS (i.e., N=1 UMTS) or N=2 F-UMTS.

Table 24 provides information regarding uplink UL slot formats for DPCCH field in accordance with various embodiments.

down by Dcr. As a result, the TPC rate may be reduced from 1500 Hz in N=1 UMTS to 1500/Dcr (i.e., 375 Hz) in N=4 F-UMTS.

In some cases, there are 32 TFCI encoded bits that may need to be transmitted at least once every 20 ms (every voice frame). Using slot format 0 in Table 10, there may be 2×15=30 TFCI encoded bits every frame duration of 10×Dcr (i.e., 40 ms). Therefore, bits b30 and b31 of the TFCI code word may not be transmitted.

Section 4.3.5.2 of 3GPP TS 25.212 mentions that for uplink compressed mode, the slot format may be changed so that no TFCI coded bits are lost. The different slot formats in compressed mode may not match the exact number of TFCI coded bits for all possible TGLs. Repetition of the TFCI bits may therefore be used.

In DL, DPCCH and DPDCH may be time multiplexed as DPCH, and may use the same spreading factor. The number of bits in the downlink DPCCH fields using modified slot format 8 may be shown in Table 22 for N=4 F-UMTS.

For the slot format used, the number of TFCI bits may be zero. Hence, unlike uplink, no special handling of TFCI may be necessary.

In some cases, the TPC and pilot bits may be simply obtained by repeating the basic patterns defined in 3GPP TS 25.211, Table 12-13.

Generally, reduction in spreading factor may have impacts on the link budget. In order to compensate for spreading factor reduction and to maintain the same voice service coverage, transmission power may be increased from that corresponding to same PSD for F-UMTS.

In some embodiments, once two voice frames (equivalently 40 ms long) are available at the MAC, they may be delivered to the PHY. After some PHY layer processing (assuming processing time does not scale with Dcr), the over-the-air transmission may be allowed to start at the next radio frame boundary due to the current spec restriction. However, for N=4 F-UMTS system, as the TTI is 10×Dcr=40 ms and the radio frame may also be 10×Dcr=40 ms, there may be additional latency compared to normal UMTS system (i.e., N=1) or N=2 F-UMTS. It may be noted that in computing the additional latency for voice over N=4 F-UMTS, the processing delay may be assumed to remain constant as in normal UMTS (i.e., N=1).

The delay may be divided into the following components. There may be delay due to TTI and radio frame dilation. For example, as the radio frame may be 10×Dcr (i.e., 40) ms long, there may be an additional latency of 20 ms for over-the-air transmission for each voice frame compared to N=1 UMTS system or N=2 F-UMTS system. They may be delay due to buffering of voice frames at Tx side. For example, as the

TABLE 24

| Slot Format #i | Channel Bitrate (kbps) | Channel Symbol Rate (ksps) | SF | Bits/Frame | Bits/Slot | NPilot | NTPC | NTFCI | NFBI | Transmit slots per radio frame |
|---|---|---|---|---|---|---|---|---|---|---|
| 0 | 15/Dcr = 3.75 | 15/Dcr = 3.75 | 256 | 150 | 10 | 6 | 2 | 2 | 0 | 15 |
| 0A | 15/Dcr = 3.75 | 15/Dcr = 3.75 | 256 | 150 | 10 | 5 | 2 | 3 | 0 | 10-14 |
| 0B | 15/Dcr = 3.75 | 15/Dcr = 3.75 | 256 | 150 | 10 | 4 | 2 | 4 | 0 | 8-9 |

It may be noted that the slot formats 0, 0A and 0B may correspond to slot formats 0, 0A and 0B respectively used in UL DPDCH of current UMTS system for normal mode.

For UL DPCCH, slot formats may have Spreading Factor 256. Hence the bits/slot and bits/frame may stay the same and channel bitrate and channel symbols rates may be scaled over-the-air transmission may only allowed at radio frame boundaries of 10×Dcr (i.e., 40) ms, one voice frame may be additionally buffered for 20 ms while the other voice frame is not. There may be delay due to buffering of voice frames at Rx side. For example, the buffering delay of voice frames at Tx side may be reflected on the Rx side also. As radio frame may be 40 ms long, 2 voice frames may come after every 40 ms. As voice frames may be played out every 20 ms, to smoothen out the inter-voice frame delay, every other voice frame may be buffered and played out 20 ms later. It may be noted that voice frames that are buffered in the Tx side may be played out immediately after reception at Rx side. On the other hand, the voice frames, that are not buffered at the Tx side, may be buffered for 20 ms at Rx side.

Hence the buffering delays at the Tx side (b) and Rx side (c) may not add up and there may be a net delay of 20 ms for (b) and (c). Overall, there may be a 20+20 ms=40 ms additional delay for voice frames in N=4 F-UMTS system. It may be noted that early decoding schemes (sometimes referred to as subframe decoding schemes) at the Rx may reduce the overall additional delay to 20 ms in N=4 F-UMTS system.

Some embodiments may provide solutions for AMR 7.95 kbps that may be similar to that for AMR 12.2 kbps and hence not described in detail. The slot formats used may be the same as in AMR 12.2 kbps even though the number of Class A, B and C bits is different in AMR 7.95 from AMR 12.2.

Embodiments for supporting AMR 12.2 kbps and AMR 7.95 kbps over N=2 and N=4 F-UMTS may be extended to support other AMR systems, such as AMR 5.9 kbps. For AMR 5.9 kbps, for example, the number of Class A, B and C bits may be different from AMR 12.2 as is the case with AMR 7.95 kbps. Additionally, unlike AMR 12.2 and AMR 7.95, AMR 5.9 may use different slot format (SF 256) in DL. However, similar techniques (SF reduction and RM tuning) can be applied over the slot format used in normal UMTS for N=2 and N=4 F-UMTS.

Figure 9:
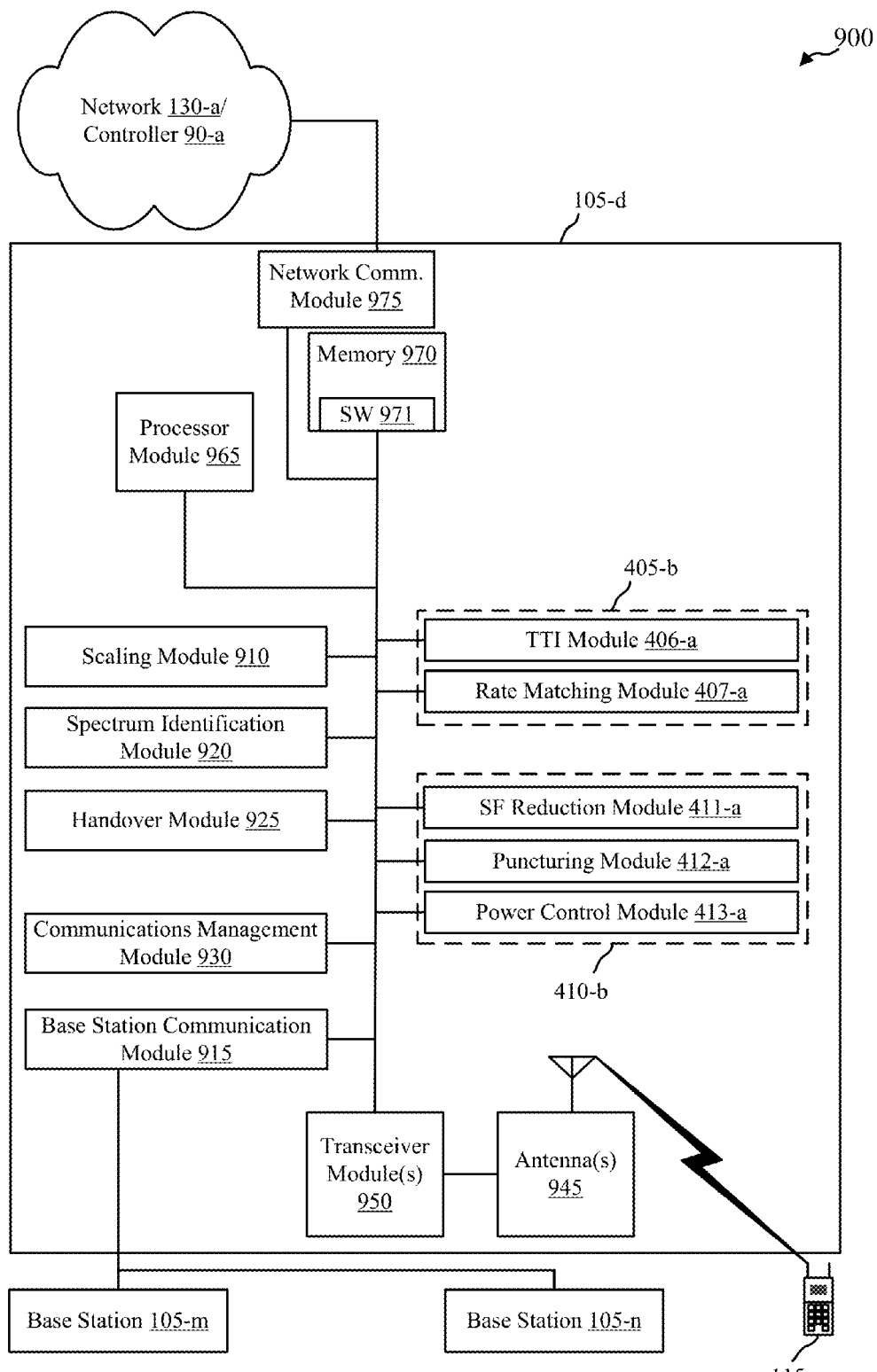
FIG. 9 shows a block diagram of a wireless communications system in accordance with various embodiments.

FIG. 9 shows a block diagram of a wireless communications system 900 in accordance with various embodiments. This system 900 may be an example of aspects of the system 100 depicted in FIG. 1, systems 200 of FIG. 2, system 300 of FIG. 3, and/or system 1100 of FIG. 11. The base station 105-*d* may include antennas 945, a transceiver module 950, memory 970, and a processor module 965, which each may be in communication, directly or indirectly, with each other (e.g., over one or more buses). The transceiver module 950 may be configured to communicate bi-directionally, via the antennas 945, with the mobile device 115-*e*, which may be a multi-mode mobile device. The transceiver module 950 (and/or other components of the base station 105-*d*) may also be configured to communicate bi-directionally with one or more networks. In some cases, the base station 105-*d* may communicate with the network 130-*a* and/or controller 110-*a* through network communications module 975. Base station 105-*d* may be an example of an eNodeB base station, a Home eNodeB base station, a NodeB base station, and/or a Home NodeB base station. Controller 110-*a* may be integrated into base station 105-*d* in some cases, such as with an eNodeB base station.

Base station 105-*d* may also communicate with other base stations 105, such as base station 105-*m* and base station 105-*n*. Each of the base stations 105 may communicate with mobile device 115-*e* using different wireless communications technologies, such as different Radio Access Technologies. In some cases, base station 105-*d* may communicate with other base stations such as 105-*m* and/or 105-*n* utilizing base station communication module 915. In some embodiments, base station communication module 915 may provide an X2 interface within an LTE wireless communication technology to provide communication between some of the base stations 105. In some embodiments, base station 105-*d* may communicate with other base stations through controller 110-*a* and/or network 130-*a*.

The memory 970 may include random access memory (RAM) and read-only memory (ROM). The memory 970 may also store computer-readable, computer-executable software code 971 containing instructions that are configured to, when executed, cause the processor module 965 to perform various functions described herein (e.g., call processing, database management, message routing, etc.). Alternatively, the software code 971 may not be directly executable by the processor module 965 but be configured to cause the computer, e.g., when compiled and executed, to perform functions described herein.

The processor module 965 may include an intelligent hardware device, e.g., a central processing unit (CPU) such as those made by Intel® Corporation or AMD®, a microcontroller, an application-specific integrated circuit (ASIC), etc. The processor module 965 may include a speech encoder (not shown) configured to receive audio via a microphone, convert the audio into packets (e.g., 30 ms in length) representative of the received audio, provide the audio packets to the transceiver module 950, and provide indications of whether a user is speaking. Alternatively, an encoder may only provide packets to the transceiver module 950, with the provision or withholding/suppression of the packet itself providing the indication of whether a user is speaking.

The transceiver module 950 may include a modem configured to modulate the packets and provide the modulated packets to the antennas 945 for transmission, and to demodulate packets received from the antennas 945. While some examples of the base station 105-*d* may include a single antenna 945, the base station 105-*d* preferably includes multiple antennas 945 for multiple links which may support carrier aggregation. For example, one or more links may be used to support macro communications with mobile device 115-*e*.

According to the architecture of FIG. 9, the base station 105-*d* may further include a communications management module 930. The communications management module 930 may manage communications with other base stations 105. By way of example, the communications management module 930 may be a component of the base station 105-*d* in communication with some or all of the other components of the base station 105-*d* via a bus. Alternatively, functionality of the communications management module 930 may be implemented as a component of the transceiver module 950, as a computer program product, and/or as one or more controller elements of the processor module 965.

The components for base station 105-*d* may be configured to implement aspects discussed above with respect to device 400-*a* in FIG. 4A and/or device 400-*b* of FIG. 4B and may not be repeated here for the sake of brevity. For example, the transport channel module 405-*b* may be the transport channel module 405 of FIG. 4 and/or transport channel module 405-*a* of FIG. 4B. The physical channel module 410-*b* may be the physical channel module 410 of FIG. 4 and/or physical channel module 410-*a* of FIG. 4B. The transmission time interval (TTI) module 406-*a* may be an example of the transmission time interval module 406 of FIG. 4B. The rate matching module 407-*a* may be an example of the rate matching module 407 of FIG. 4B. The spreading factor (SF) reduction module 411-*a* may be an example of the spreading factor reduction module 411 of FIG. 4B. The puncturing module 412-*a* may be an example of the puncturing module 412 of FIG. 4B. The power control module 413-*a* may be an example of the power control module 413 of FIG. 4B. In some cases, the transport channel module 405-*b* may include a concatenation module (not shown) as described with respect to concatenation module 408 of device 400-*b* of FIG. 4B.

The base station 105-*d* may also include a spectrum identification module 920. The spectrum identification module 920 may be utilized to identify spectrum available for flexible waveforms. In some embodiments, a handover module 925 may be utilized to perform handover procedures of the mobile device 115-*e* from one base station 105 to another. For example, the handover module 925 may perform a handover procedure of the mobile device 115-*e* from base station 105-*d* to another where normal waveforms are utilized between the mobile device 115-*e* and one of the base stations and flexible waveforms are utilized between the mobile device and another base station. A scaling module 910 may be utilized to scale and/or alter chip rates to generate flexible waveforms.

In some embodiments, the transceiver module 950 in conjunction with antennas 945, along with other possible components of base station 105-*d*, may transmit information regarding flexible waveforms and/or scaling factors from the base station 105-*d* to the mobile device 115-*e*, to other base stations 105-*m*/105-*n*, or core network 130-*a*. In some embodiments, the transceiver module 950 in conjunction with antennas 945, along with other possible components of base station 105-*d*, may transmit information to the mobile device 115-*e*, to other base stations 105-*m*/105-*n*, or core network 130-*a*, such as flexible waveforms and/or scaling factors, such that these devices or systems may utilize flexible waveforms.

Figure 10:
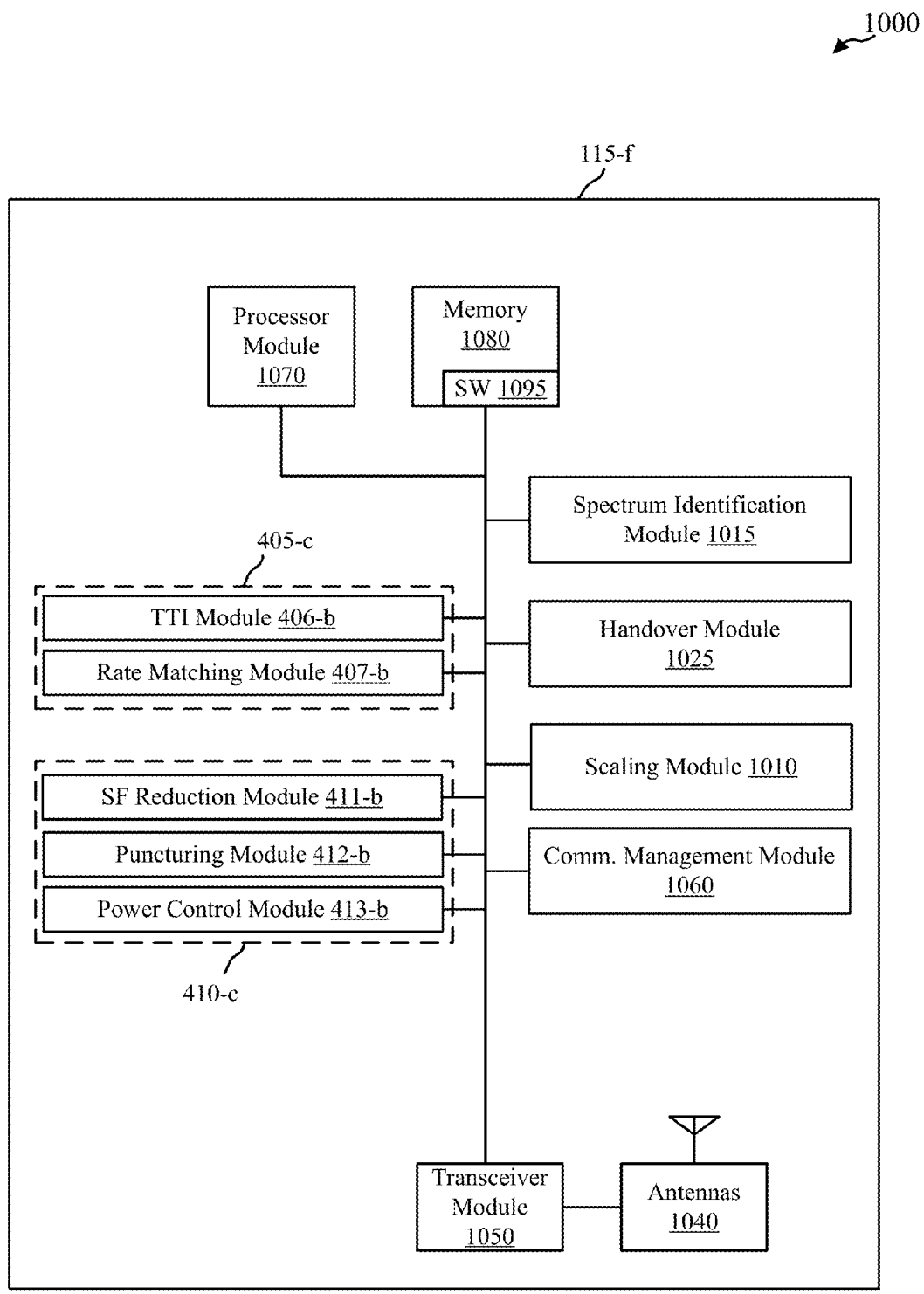
FIG. 10 shows a block diagram of a mobile device in accordance with various embodiments.

FIG. 10 is a block diagram 1000 of a mobile device 115-*f* in accordance with various embodiments. The mobile device 115-*f* may have any of various configurations, such as personal computers (e.g., laptop computers, netbook computers, tablet computers, etc.), cellular telephones, PDAs, digital video recorders (DVRs), internet appliances, gaming consoles, e-readers, etc. The mobile device 115-*f* may have an internal power supply (not shown), such as a small battery, to facilitate mobile operation. In some embodiments, the mobile device 115-*f* may be the mobile device 115 of FIG. 1, FIG. 2, FIG. 3, FIG. 9, and/or FIG. 11, and/or the device 400-*a* of FIG. 4*a* and/or device 400-*b* of FIG. 4B. The mobile device 115-*f* may be a multi-mode mobile device. The mobile device 115-*f* may be referred to as a wireless communications device in some cases.

The mobile device 115-*f* may include antennas 1040, a transceiver module 1050, memory 1080, and a processor module 1070, which each may be in communication, directly or indirectly, with each other (e.g., via one or more buses). The transceiver module 1050 is configured to communicate bi-directionally, via the antennas 1040 and/or one or more wired or wireless links, with one or more networks, as described above. For example, the transceiver module 1050 may be configured to communicate bi-directionally with base stations 105 of FIG. 1, FIG. 2, FIG. 3, FIG. 9, and/or FIG. 11. The transceiver module 1050 may include a modem configured to modulate the packets and provide the modulated packets to the antennas 1040 for transmission, and to demodulate packets received from the antennas 1040. While the mobile device 115-*f* may include a single antenna, the mobile device 115-*f* will typically include multiple antennas 1040 for multiple links.

The memory 1080 may include random access memory (RAM) and read-only memory (ROM). The memory 1080 may store computer-readable, computer-executable software code 1095 containing instructions that are configured to, when executed, cause the processor module 1070 to perform various functions described herein (e.g., call processing, database management, message routing, etc.). Alternatively, the software 1095 may not be directly executable by the processor module 1070 but be configured to cause the computer (e.g., when compiled and executed) to perform functions described herein.

The processor module 1070 may include an intelligent hardware device, e.g., a central processing unit (CPU) such as those made by Intel® Corporation or AMD®, a microcontroller, an application-specific integrated circuit (ASIC), etc. The processor module 1070 may include a speech encoder (not shown) configured to receive audio via a microphone, convert the audio into packets (e.g., 20 ms in length) representative of the received audio, provide the audio packets to the transceiver module 1050, and provide indications of whether a user is speaking. Alternatively, an encoder may only provide packets to the transceiver module 1050, with the provision or withholding/suppression of the packet itself providing the indication of whether a user is speaking.

According to the architecture of FIG. 10, the mobile device 115-*f* may further include a communications management module 1060. The communications management module 1060 may manage communications with other mobile devices 115. By way of example, the communications management module 1060 may be a component of the mobile device 115-*f* in communication with some or all of the other components of the mobile device 115-*f* via a bus. Alternatively, functionality of the communications management module 1060 may be implemented as a component of the transceiver module 1050, as a computer program product, and/or as one or more controller elements of the processor module 1070.

The components for mobile device 115-*f* may be configured to implement aspects discussed above with respect to device 400-*a* in FIG. 4A and/or device 400-*b* of FIG. 4B and may not be repeated here for the sake of brevity. For example, the transport channel module 405-*c* may be the transport channel module 405 of FIG. 4 and/or transport channel module 405-*a* of FIG. 4B. The physical channel module 410-*c* may be the physical channel module 410 of FIG. 4 and/or physical channel module 410-*a* of FIG. 4B. The transmission time interval (TTI) module 406-*b* may be an example of the transmission time interval module 406 of FIG. 4B. The rate matching module 407-*b* may be an example of the rate matching module 407 of FIG. 4B. The spreading factor (SF) reduction module 411-*b* may be an example of the spreading factor reduction module 411 of FIG. 4B. The puncturing module 412-*b* may be an example of the puncturing module 412 of FIG. 4B. The power control module 413-*b* may be an example of the power control module 413 of FIG. 4B. In some cases, the transport channel module 405-*c* may include a concatenation module (not shown) as described with respect to concatenation module 408 of device 400-*b* of FIG. 4B.

The mobile device 115-*f* may also include a spectrum identification module 1015. The spectrum identification module 1015 may be utilized to identify spectrum available for flexible waveforms. In some embodiments, a handover module 1025 may be utilized to perform handover procedures of the mobile device 115-*f* from one base station to another. For example, the handover module 1025 may perform a handover procedure of the mobile device 115-*f* from one base station to another where normal waveforms are utilized between the mobile device 115-*f* and one of the base stations and flexible waveforms are utilized between the mobile device and another base station. A scaling module 1010 may be utilized to scale and/or alter chip rates to generate flexible waveforms.

In some embodiments, the transceiver module 1050 in conjunction with antennas 1040, along with other possible components of mobile device 115-*f*, may transmit information regarding flexible waveforms and/or scaling factors from the mobile device 115-*f* to base stations or a core network. In some embodiments, the transceiver module 1050, in conjunction with antennas 1040 along with other possible components of mobile device 115-*f*, may transmit information, such as flexible waveforms and/or scaling factors, to base stations or a core network such that these devices or systems may utilize flexible waveforms.

Figure 11:
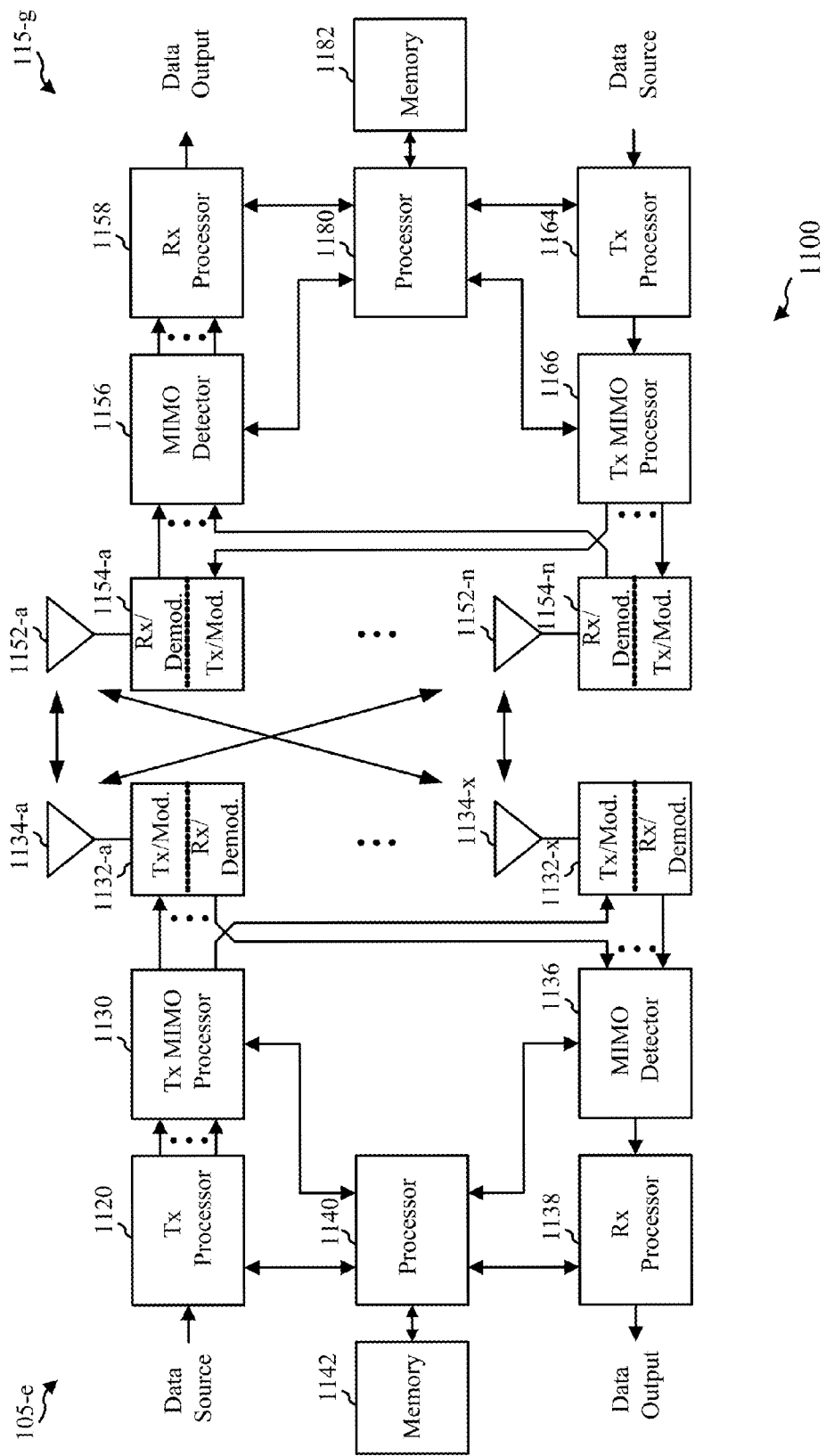
FIG. 11 shows a block diagram of a wireless communications system that includes a base station and a mobile device in accordance with various embodiments.

FIG. 11 is a block diagram of a system 1100 including a base station 105-*e* and a mobile device 115-*g* in accordance with various embodiments. This system 1100 may be an example of the system 100 of FIG. 1, systems 200 of FIG. 2, system 300 of FIG. 3, and/or system 900 of FIG. 9. The base station 105-*e* may be equipped with antennas 1134-*a* through 1134-*x*, and the mobile device 115-*g* may be equipped with antennas 1152-*a* through 1152-*n*. At the base station 105-*e*, a transmitter processor 1120 may receive data from a data source. Base stations 105-*e* and/or mobile device 115-*g* may implement aspects of device 400-*a* of FIG. 4A and/or device 400-*b* of FIG. 4B. Mobile device 115-*g* may be an example of mobile device 115-*f* of FIG. 10.

The transmitter processor 1120 may process the data. The transmitter processor 1120 may also generate reference symbols, and a cell-specific reference signal. A transmit (TX) MIMO processor 1130 may perform spatial processing (e.g., precoding) on data symbols, control symbols, and/or reference symbols, if applicable, and may provide output symbol streams to the transmit modulators 1132-*a* through 1132-*x*. Each modulator 1132 may process a respective output symbol stream (e.g., for OFDM, etc.) to obtain an output sample stream. Each modulator 1132 may further process (e.g., convert to analog, amplify, filter, and upconvert) the output sample stream to obtain a downlink (DL) signal. In one example, DL signals from modulators 1132-*a* through 1132-*x* may be transmitted via the antennas 1134-*a* through 1134-*x*, respectively. The transmitter processor 1120 may receive information from a processor 1140. The processor 1140 may be configured to generate flexible waveforms through altering a chip rate and/or utilizing a scaling factor; this may be done dynamically in some cases. The processor 1140 may also provide for different alignment and/or offsetting procedures. The processor 1140 may also utilize scaling and/or chip rate information to perform measurements on the other subsystems, perform handoffs to the other subsystems, perform reselection, etc. The processor 1140 may invert the effects of time stretching associated with the use of flexible bandwidth through parameter scaling. In some embodiments, the processor 1140 may be implemented as part of a general processor, the transmitter processor 1120, and/or the receiver processor 1138. The processor 1140 may be coupled with a memory 1142.

In some embodiments, processor 1140 and/or Tx processor 1120 are configured for providing data, such as voice data for a voice service, over a flexible bandwidth carrier. In providing such data and/or services over the flexible bandwidth carrier, processor 1140 and/or Tx processor 1120 may be configured for keeping the information data rate for a flexible bandwidth carrier at a rate that is at least the data rate as that of the normal bandwidth carrier. For example, one voice frame may still be mapped to a 20 ms time window upon transmission, irrespective of N or Dcr. In some embodiments, processor 1140 and/or Tx processor 1120 are configured for identifying a data rate for a normal bandwidth carrier. Processor 1140 and/or Tx processor 1120 may determine a reduced spreading factor for the flexible bandwidth carrier such that a data rate for the flexible bandwidth carrier may achieve at least the identified data rate for the normal bandwidth carrier. The reduced spreading factor may be utilized to achieve the data rate for the flexible bandwidth carrier by the processor 1140 and/or Tx processor 1120.

At the mobile device 115-*g*, the mobile device antennas 1152-*a* through 1152-*n* may receive the DL signals from the base station 105-*e* and may provide the received signals to the demodulators 1154-*a* through 1154-*n*, respectively. Each demodulator 1154 may condition (e.g., filter, amplify, downconvert, and digitize) a respective received signal to obtain input samples. Each demodulator 1154 may further process the input samples (e.g., for OFDM, etc.) to obtain received symbols. A MIMO detector 1156 may obtain received symbols from all the demodulators 1154-*a* through 1154-*n*, perform MIMO detection on the received symbols if applicable, and provide detected symbols. A receive processor 1158 may process (e.g., demodulate, deinterleave, and decode) the detected symbols, providing decoded data for the mobile device 115-*g* to a data output, and provide decoded control information to a processor 1180, or memory 1182.

On the uplink (UL), at the mobile device 115-*g*, a transmitter processor 1164 may receive and process data from a data source. The transmitter processor 1164 may also generate reference symbols for a reference signal. The symbols from the transmitter processor 1164 may be precoded by a transmit MIMO processor 1166 if applicable, further processed by the demodulators 1154-*a* through 1154-*n* (e.g., for SC-FDMA, etc.), and be transmitted to the base station 105-*e* in accordance with the transmission parameters received from the base station 105-*e*. The transmitter processor 1164 may also be configured to generate flexible waveforms through altering a chip rate and/or utilizing a scaling factor; this may be done dynamically in some cases. The transmitter processor 1164 may receive information from processor 1180. The processor 1180 may provide for different alignment and/or offsetting procedures. The processor 1180 may also utilize scaling and/or chip rate information to perform measurements on the other subsystems, perform handoffs to the other subsystems, perform reselection, etc. The processor 1180 may invert the effects of time stretching associated with the use of flexible bandwidth through parameter scaling. At the base station 105-*e*, the UL signals from the mobile device 115-*g* may be received by the antennas 1134, processed by the demodulators 1132, detected by a MIMO detector 1136 if applicable, and further processed by a receive processor. The receive processor 1138 may provide decoded data to a data output and to the processor 1180. In some embodiments, the processor 1180 may be implemented as part of a general processor, the transmitter processor 1164, and/or the receiver processor 1158.

In some embodiments, processor 1180 and/or Tx processor 1164 are configured for providing data, such as voice data for a voice service, over a flexible bandwidth carrier. In providing such data and/or services over the flexible bandwidth carrier, processor 1180 and/or Tx processor 1164 may be configured for keeping the information data rate for a flexible bandwidth carrier at a rate that is at least the data rate as that of the normal bandwidth carrier. For example, one voice frame may still be mapped to a 20 ms time window upon transmission, irrespective of N or Dcr. In some embodiments, processor 1180 and/or Tx processor 1164 are configured for identifying a data rate for a normal bandwidth carrier. Processor 1180 and/or Tx processor 1164 may determine a reduced spreading factor for the flexible bandwidth carrier such that a data rate for the flexible bandwidth carrier may achieve at least the identified data rate for the normal bandwidth carrier. The reduced spreading factor may be utilized to achieve the data rate for the flexible bandwidth carrier by the processor 1180 and/or Tx processor 1164.

Figure 12A:
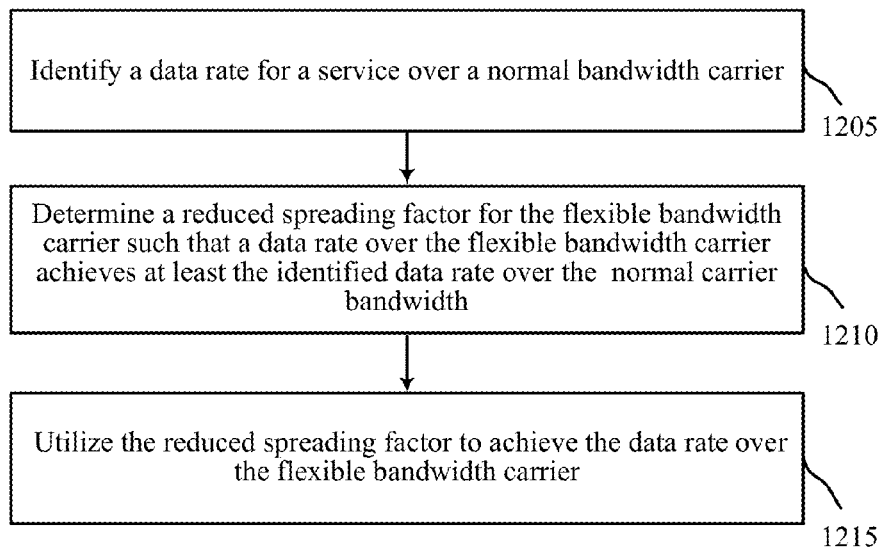
FIG. 12A shows a flow diagram of a method for providing data, such as voice data for a voice service, a flexible bandwidth carrier in accordance with various embodiments.

Turning to FIG. 12A, a flow diagram of a method 1200-*a* for providing data, such as voice data as part of a voice service, over a flexible bandwidth carrier in accordance with various embodiments. Method 1200-*a* may be implemented utilizing various wireless communications devices including, but not limited to: a base station 105 as seen in FIG. 1, FIG. 2, FIG. 3, FIG. 9, and/or FIG. 11; and/or a devices 400 as seen in FIG. 4. In some embodiments, method 1200-*a* may be implemented utilizing various wireless communications devices including, but not limited to: a mobile device 115 as seen in FIG. 1, FIG. 2, FIG. 3, FIG. 9, FIG. 10, and/or FIG. 11.

At block 1205, a data rate for a service over a normal bandwidth carrier may be identified. At block 1210, a reduced spreading factor for the flexible bandwidth carrier may be determined such that a data rate over the flexible bandwidth carrier may achieve at least the identified data rate over the normal bandwidth carrier. At block 1215, the reduced spreading factor may be utilized to achieve the data rate over the flexible bandwidth carrier.

Some embodiments of method 1200-*a* include fitting one or both of a first voice frame and a second voice frame into a first radio frame of the flexible bandwidth carrier. The first radio frame may be a dilated radio frame.

Determining the reduced spreading factor may include dividing a spreading factor of the normal bandwidth carrier by a chip rate divider of the flexible bandwidth carrier. The chip rate divider may equal a bandwidth scaling factor of the flexible bandwidth carrier.

The date rate over the flexible bandwidth carrier may depend upon an application of the data over the flexible bandwidth carrier. The application of the data over the flexible bandwidth carrier may include a voice application.

Some embodiments include applying rate matching tuning through at least a puncturing process or a repetition process. Some embodiments include increasing a transmission power to compensate for at least the reduced spreading factor. Some embodiments include determining a transmission time interval to facilitate achieving the data rate for the flexible bandwidth carrier.

The flexible bandwidth carrier may include a flexible bandwidth UMTS system with a bandwidth scaling factor equal to 2 or 4.

Figure 12B:
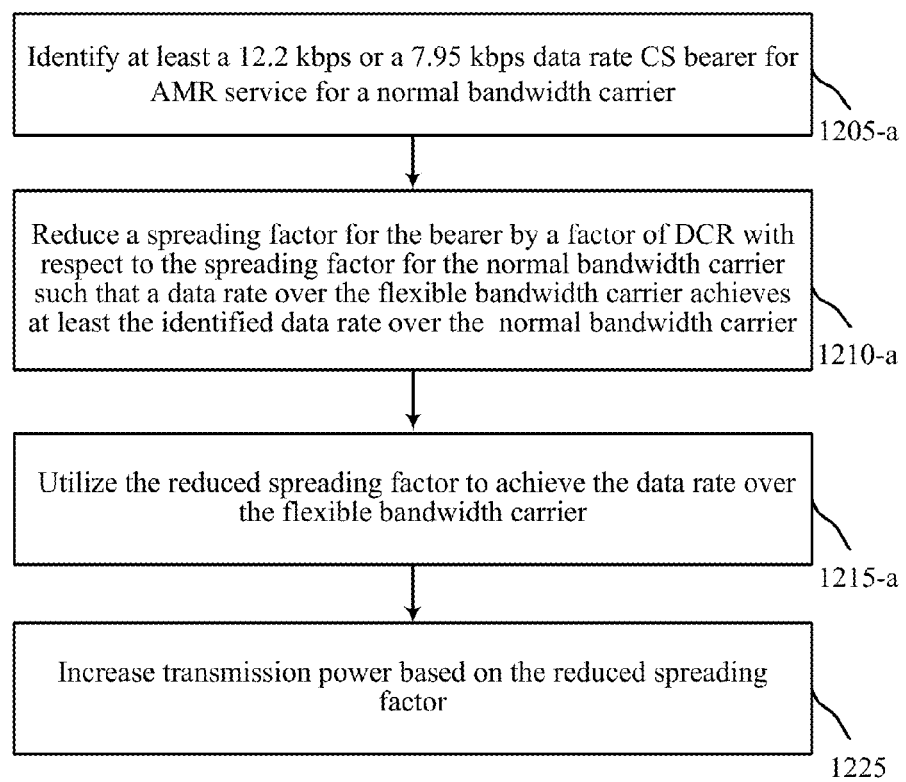
FIG. 12B shows a flow diagram of a method for providing data, such as voice data for a voice service, a flexible bandwidth carrier in accordance with various embodiments.

Turning to FIG. 12B, a flow diagram of a method 1200-*b* for providing data, such as voice data as part of a voice service, over a flexible bandwidth carrier in accordance with various embodiments. Method 1200-*b* may be implemented utilizing various wireless communications devices including, but not limited to: a base station 105 as seen in FIG. 1, FIG. 2, FIG. 3, FIG. 9, and/or FIG. 11; and/or a devices 400 as seen in FIG. 4. In some embodiments, method 1200-*b* may be implemented utilizing various wireless communications devices including, but not limited to: a mobile device 115 as seen in FIG. 1, FIG. 2, FIG. 3, FIG. 9, FIG. 10, and/or FIG. 11. Method 1200-*b* may be an example of method 1200-*a* of FIG. 12A, and may utilize or more aspects of method 1200-*a*.

At block 1205-*a*, at least a 12.2 kbps or a 7.95 kbps data rate CS bearer for AMR service for a normal bandwidth carrier may be identified. At block 1210-*a*, a spreading factor for the bearer may be reduced by a factor of DCR with respect to the spreading factor for the normal bandwidth carrier such that a data rate over the flexible bandwidth carrier achieves at least the identified data rate over the normal carrier bandwidth system. At block 1215-*a*, the reduced spreading factor may be utilized to achieve the data rate over the flexible bandwidth carrier. At block 1225, transmission power may be increased based on the reduced spreading factor.

Figure 12C:
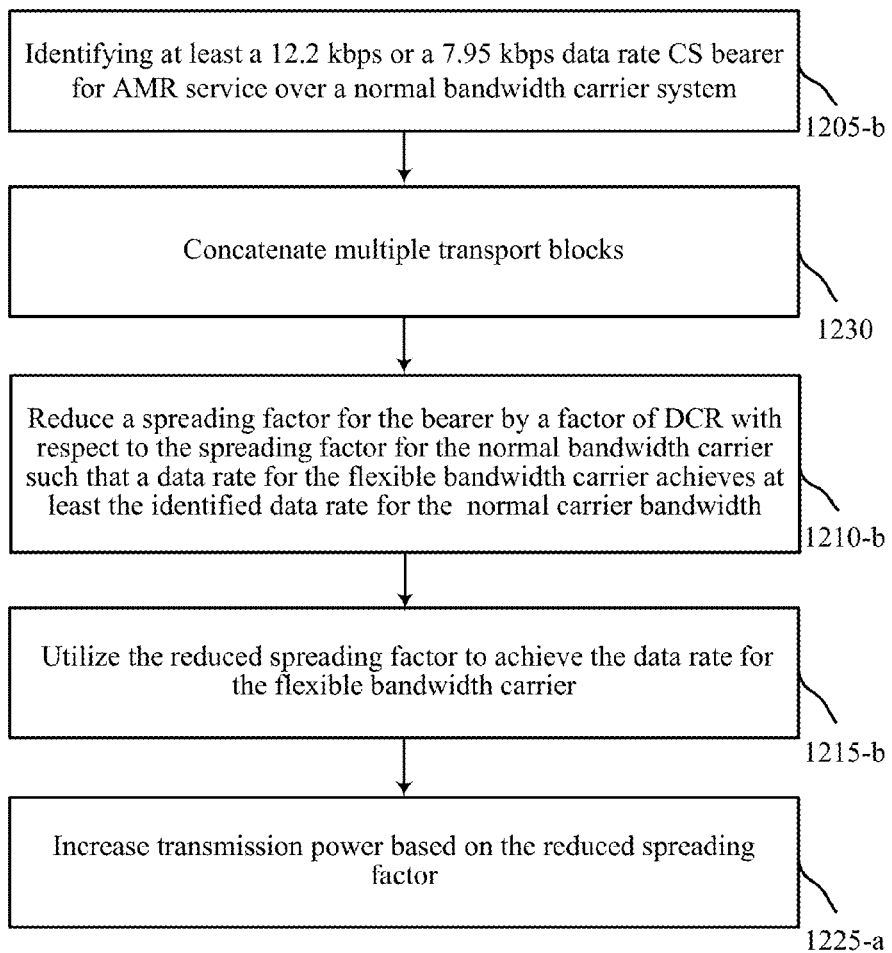
FIG. 12C shows a flow diagram of a method for providing data, such as voice data for a voice service, a flexible bandwidth carrier in accordance with various embodiments.

Turning to FIG. 12C, a flow diagram of a method 1200-*c* for providing data, such as voice data as part of a voice service, over a flexible bandwidth carrier in accordance with various embodiments. Method 1200-*c* may be implemented utilizing various wireless communications devices including, but not limited to: a base station 105 as seen in FIG. 1, FIG. 2, FIG. 3, FIG. 9, and/or FIG. 11; and/or a devices 400 as seen in FIG. 4. In some embodiments, method 1200-*c* may be implemented utilizing various wireless communications devices including, but not limited to: a mobile device 115 as seen in FIG. 1, FIG. 2, FIG. 3, FIG. 9, FIG. 10, and/or FIG. 11. Method 1200-*c* may be an example of method 1200-*a* of FIG. 12A, and may utilize or more aspects of method 1200-*a*.

At block 1205-*b*, at least a 12.2 kbps or a 7.95 kbps data rate CS bearer for AMR service over a normal bandwidth carrier may be identified. At block 1230, multiple transport blocks may be concatenated. At block 1210-*b*, a spreading factor for the bearer may be reduced by a factor of DCR with respect to the spreading factor for the normal bandwidth carrier such that a data rate over the flexible bandwidth carrier achieves at least the identified data rate over the normal bandwidth carrier. At block 1215-*b*, the reduced spreading factor may be utilized to achieve the data rate over the flexible bandwidth carrier. At block 1225-*a*, transmission power may be increased based on the reduced spreading factor.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for providing data over a flexible bandwidth carrier, the method comprising:
    identifying a data rate for a service over a normal bandwidth carrier;
    determining a reduced spreading factor for the flexible bandwidth carrier such that a data rate over the flexible bandwidth carrier achieves at least the identified data rate over the normal bandwidth carrier; and
    utilizing the reduced spreading factor to achieve the data rate over the flexible bandwidth carrier.

2. The method of claim 1, further comprising:
    fitting one or both of a first voice frame and a second voice frame into a first radio frame of the flexible bandwidth carrier.

3. The method of claim 2, wherein the flexible bandwidth carrier includes a flexible bandwidth UMTS carrier with a bandwidth scaling factor equal to 2 or 4.

4. The method of claim 2, wherein the first radio frame is a dilated radio frame.

5. The method of claim 1, wherein determining the reduced spreading factor comprises:
    dividing a spreading factor of the normal bandwidth carrier by a chip rate divider of the flexible bandwidth carrier.

6. The method of claim 5, wherein the chip rate divider equals a bandwidth scaling factor of the flexible bandwidth carrier.

7. The method of claim 1, wherein the date rate over the flexible bandwidth carrier depends upon an application of the data over the flexible bandwidth carrier.

8. The method of claim 7, wherein the application of the data over the flexible bandwidth carrier includes a voice application.

9. The method of claim 1, further comprising:
    applying rate matching tuning through at least a puncturing process or a repetition process.

10. The method of claim 1, further comprising:
    increasing a transmission power to compensate for at least the reduced spreading factor.

11. The method of claim 1, further comprising:
    determining a Transmission Time Interval to further facilitate the date rate for the flexible bandwidth carrier.

12. A wireless communications system configured for providing data over a flexible bandwidth carrier, the system comprising:
    means for identifying a data rate for s service over a normal bandwidth carrier;
    means for determining a reduced spreading factor for the flexible bandwidth carrier such that a data rate over the flexible bandwidth carrier is at least the identified data rate over the normal bandwidth carrier; and
    means for utilizing the reduced spreading factor to achieve the data rate over the flexible bandwidth carrier.

13. The wireless communications system of claim 12, further comprising:
    means for fitting one or both of a first voice frame and a second voice frame into a first radio frame of the flexible bandwidth carrier.

14. The wireless communications system of claim 13, wherein the flexible bandwidth carrier includes a flexible bandwidth UMTS carrier with a bandwidth scaling factor equal to 2 or 4.

15. The wireless communications system of claim 13, wherein the first radio frame is a dilated radio frame.

16. The wireless communications system of claim 13, wherein the date rate over the flexible bandwidth carrier depends upon an application of the data over the flexible bandwidth carrier.

17. The wireless communications system of claim 16, wherein the application of the data over the flexible bandwidth carrier includes a voice application.

18. The wireless communications system of claim 12, wherein the means for determining the reduced spreading factor comprises:
    means for dividing a spreading factor of the normal bandwidth carrier by a chip rate divider of the flexible bandwidth carrier.

19. The wireless communications system of claim 18, wherein the chip rate divider equals a bandwidth scaling factor of the flexible bandwidth carrier.

20. The wireless communications system of claim 12, further comprising:
means for applying rate matching tuning through at least a puncturing process or a repetition process.

21. The wireless communications system of claim 12, further comprising:
means for increasing a transmission power to compensate for at least the reduced spreading factor.

22. The wireless communications system of claim 12, further comprising:
means for determining a Transmission Time Interval to further facilitate the date rate for the flexible bandwidth carrier.

23. A computer program product for providing data over a flexible bandwidth carrier comprising:
a non-transitory computer-readable medium comprising:
code for identifying a data rate for a service over a normal bandwidth carrier;
code for determining a reduced spreading factor for the flexible bandwidth carrier such that a data rate over the flexible bandwidth carrier is at least the identified the data rate over the normal bandwidth carrier; and
code for utilizing the reduced spreading factor to achieve the data rate over the flexible bandwidth carrier.

24. The computer program product of claim 23, wherein the non-transitory computer-readable medium further comprising:
code for fitting one or both of a first voice frame and a second voice frame into a first radio frame of the flexible bandwidth carrier.

25. The computer program product of claim 24, wherein the flexible bandwidth carrier includes a flexible bandwidth UMTS carrier with a bandwidth scaling factor equal to 2 or 4.

26. The computer program product of claim 24, wherein the first radio frame is a dilated radio frame.

27. The computer program product of claim 23, wherein the code for determining the reduced spreading factor comprises:
code for dividing a spreading factor of the normal bandwidth carrier by a chip rate divider of the flexible bandwidth carrier.

28. The computer program product of claim 27, wherein the chip rate divider equals a bandwidth scaling factor of the flexible bandwidth carrier.

29. The computer program product of claim 23, wherein the date rate over the flexible bandwidth carrier depends upon an application of the data over the flexible bandwidth carrier.

30. The computer program product of claim 29, wherein the application of the data over the flexible bandwidth carrier includes a voice application.

31. The computer program product of claim 23, wherein the non-transitory computer-readable medium further comprising:
code for applying rate matching tuning through at least a puncturing process or a repetition process.

32. The computer program product of claim 23, wherein the non-transitory computer-readable medium further comprising:
code for increasing a transmission power to compensate for at least the reduced spreading factor.

33. The computer program product of claim 23, wherein the non-transitory computer-readable medium further comprising:
code for determining a Transmission Time Interval to further facilitate the date rate for the flexible bandwidth carrier.

34. A wireless communications device configured for providing data over a flexible bandwidth carrier, the device comprising:
at least one processor configured to:
identify a data rate for a service over a normal bandwidth carrier;
determine a reduced spreading factor for the flexible bandwidth carrier such that a data rate over the flexible bandwidth carrier is at least the identified data rate over the normal bandwidth carrier; and
utilize the reduced spreading factor to achieve the data rate over the flexible bandwidth carrier.

35. The wireless communications device of claim 34, wherein the at least one processor is further configured to:
fit one or both of a first voice frame and a second voice frame into a first radio frame of the flexible bandwidth carrier.

36. The wireless communications device of claim 35, wherein the flexible bandwidth carrier includes a flexible bandwidth UMTS system with a bandwidth scaling factor equal to 2 or 4.

37. The wireless communications device of claim 35, wherein the first radio frame is a dilated radio frame.

38. The wireless communications device of claim 34, wherein the at least one processor configured to determine the reduced spreading factor is configured to:
divide a spreading factor of the normal bandwidth carrier by a chip rate divider of the flexible bandwidth carrier.

39. The wireless communications device of claim 38, wherein the chip rate divider equals a bandwidth scaling factor of the flexible bandwidth carrier.

40. The wireless communications device of claim 34, wherein the date rate over the flexible bandwidth carrier depends upon an application of the data over the flexible bandwidth carrier.

41. The wireless communications device of claim 40, where the application of the data over the flexible bandwidth carrier includes a voice application.

42. The wireless communications device of claim 34, wherein the at least one processor is further configured to:
apply rate matching tuning through at least a puncturing process or a repetition process.

43. The wireless communications device of claim 34, wherein the at least one processor is further configured to:
increase a transmission power to compensate for at least the reduced spreading factor.

44. The wireless communications device of claim 34, wherein the at least one processor is further configured to:
determine a Transmission Time Interval to further facilitate the date rate for the flexible bandwidth carrier.

* * * * *